(12) United States Patent
Shirota et al.

(10) Patent No.: US 7,637,581 B2
(45) Date of Patent: Dec. 29, 2009

(54) INK JET HEAD SUBSTRATE HAVING HEAT GENERATING RESISTOR AND INK JET HEAD AND RECORDING METHOD USING SAME

(75) Inventors: Koromo Shirota, Kawasaki (JP); Teruo Ozaki, Yokohama (JP); Masahiko Kubota, Tokyo (JP); Ryuji Katsuragi, Tokyo (JP); Hidehiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 11/689,248

(22) Filed: Mar. 21, 2007

(65) Prior Publication Data
US 2007/0159512 A1 Jul. 12, 2007

Related U.S. Application Data

(62) Division of application No. 09/677,867, filed on Oct. 3, 2000, now Pat. No. 7,219,971.

(30) Foreign Application Priority Data

| Oct. 5, 1999 | (JP) | ............................. 1999-284961 |
| Sep. 20, 2000 | (JP) | ............................. 2000-285572 |

(51) Int. Cl.
*B41J 29/38* (2006.01)
*B41J 2/05* (2006.01)

(52) U.S. Cl. ............................................. 347/9; 347/56

(58) Field of Classification Search ................... 347/54, 347/56, 9, 14–15, 46, 62–64; 29/25.35
See application file for complete search history.

(56) References Cited

U.S. PATENT DOCUMENTS

| 4,463,359 A | 7/1984 | Ayata et al. ................... 346/1.1 |
| 5,062,892 A | 11/1991 | Halko ........................... 106/22 |
| 5,448,273 A | 9/1995 | Klein et al. ..................... 347/64 |
| 5,521,621 A | 5/1996 | Endo et al. ...................... 347/15 |
| 5,549,740 A | 8/1996 | Takahashi et al. .............. 106/20 |
| 5,581,281 A | 12/1996 | Fuse ............................ 347/14 |
| 5,660,739 A | 8/1997 | Ozaki et al. ................... 216/27 |
| 5,880,751 A | 3/1999 | Nishikori et al. ............... 347/14 |
| 5,880,762 A | 3/1999 | Ishinaga et al. ................ 347/62 |
| 6,120,130 A | 9/2000 | Hirano et al. .................. 347/46 |
| 6,357,862 B1 | 3/2002 | Ozaki et al. ................... 347/58 |

FOREIGN PATENT DOCUMENTS

| EP | 0 934 829 | 8/1999 |
| JP | 54-59936 | 5/1979 |
| JP | 55-132253 | 10/1980 |
| JP | 3-160070 | 7/1991 |
| JP | 8-80664 | 3/1996 |
| JP | 10-204351 | 8/1998 |

OTHER PUBLICATIONS

Patent Abstracts of Japan, vol. 1998, No. 13 (Nov. 30, 1998).

*Primary Examiner*—K. Feggins
(74) *Attorney, Agent, or Firm*—Fitzpatrick, Cella, Harper & Scinto

(57) ABSTRACT

An ink jet recording method of ejecting ink using an ink jet head substrate provided with a heat generating resistor which is coated with a protecting film, wherein the ink is ejected by a pressure produced by generation of a bubble created by film boiling of the ink caused by application of thermal energy to the ink through the protecting film, the thermal energy being generated by driving of the heat generating resistor, the improvement residing in that:

there is provided a recording mode in which the ink is ejected with a maximum temperature at the surface of the protecting film which is contacted to the ink not higher than 560° C.

7 Claims, 11 Drawing Sheets

P1:PR-HEAT PLS   (=T1) [WITH PWM]
P2:INTRVL        (=T2-T1)
P3:MAIN HEAT PLS (=T3-T2)
VOP:DRIVING VOL

INK JET HEAD SUBSTRATE HAVING HEAT GENERATING RESISTOR AND INK JET HEAD AND RECORDING METHOD USING SAME

This application is a division of application Ser. No. 09/677,867, filed Oct. 3, 2000, the entire disclosure of which is incorporated herein by reference.

FIELD OF THE INVENTION AND RELATED ART

The present invention relates to a base board, for an ink jet head which uses thermal energy, to eject ink droplets in response to recording signals, to form images on recording medium. It also relates to an ink jet head, an ink jet apparatus, and an ink jet recording method.

Presently, there have been proposed various ink jet recording methods. Among those ink jet recording methods, the mainstream methods are those which record images by ejecting ink droplets by applying heat from exothermic resistors to the ink within a chamber in a recording head, in accordance with recording signals. As an example of such an ink jet recording method, there is the ink jet recording method disclosed in Laid-Open Japanese Patent No. 59,936/1979, according to which the phenomenon that application of thermal energy to ink generates bubbles in the ink, is used to eject ink. This type of ink jet recording method has become one of the mainstream methods in the present field of ink jet recording, because, according to this method, the openings (hereinafter, opening may be referred to as orifice) from which ink is ejected can be easily disposed in high density.

It has been known that in a recording method which records images by ejecting ink from orifices by applying thermal energy to ink, in accordance with recording signals, with the use of exothermic resistors, the size of an ink droplet is dependent upon the apparatus conditions such as the amounts of thermal energy or pressure applied to ink, and physical properties, such as specific heat, thermal conductivity, thermal expansion constant, or viscosity, of ink. Thus, in order to consistently eject ink, many proposals have been made to control these factors. For example, Laid-Open Japanese Patent No. 132,253/1980 pays attention to a method for controlling the rising and falling of the voltage applied to a heat generating element, and also the fact that the temperature of an exothermic resistor changes in response to the changes in pulse width and pulse amplitude, and therefore, the bubble volume also changes in response to the changes in pulse width and pulse amplitude. Thus, it discloses an ink jet recording method which controls pulse width and pulse amplitude to eject ink consistently. The characteristics of a present day ink jet head definitely meet this technical standard. However, if substances which change in physical properties when heated are contained in the ink, foreign substances (hereinafter, this may be referred to as burnt deposit) sometimes precipitate. If such foreign substances continue to precipitate by a large amount, they gradually precipitate on the surface of the protective film, which sometimes results in reduction in the efficiency with which heat is conducted to ink, and therefore, inconsistency in bubble generation. Consequently, bubbles necessary for ink ejection fail to be satisfactorily formed, and therefore, ink fails to be ejected by the amount necessary for normal recording, or ink is not ejected at all; in other words, there is a decline in the consistency with which ink is ejected. Also in recent years, a recording head has been drastically reduced in size, and also drastically improved in terms of operational precision, and with these improvements, the amount of ink ejected through a single ejection cycle has been decreasing. Consequently, the amount of energy which an exothermic resistor must apply to ink has also become smaller. In such an environment in which the amount of burnt deposit which adheres to the protective film is relatively small for the above described reason, the effects of the burnt deposit which adheres to the protective film, upon the ratio of the thermal energy prevented from being conducted from a heat generating element to ink, is rather large, sometimes causing changes in the amount by which ink is ejected, and therefore, derogatorily affecting the recording of highly precise images. Thus, it has become necessary to strictly control the generation of burnt deposit.

In the past, the above described precipitation of burnt ink ingredients has been dealt with by modifying ink in terms of ingredient.

It has been known that the burnt deposit contains both inorganic components such Fe and organic components.

As for the inorganic components, it is thought that the problem involving the inorganic components can be solved by adding chelating reagent to ink, because the addition of chelating reagent stabilizes ink by coordinating inorganic components. As for the organic components, it is thought that the problem involving the organic components can also be solved by the addition of chelating reagent to ink, because chelating reagent prevents organic components from crystallizing on the exothermic resistant layer. In other words, it is thought that the addition of chelating reagent to ink prevents carbonized deposit from accumulating on the exothermic resistant layer. Further, Laid-Open Japanese Patent Nos. 160,070/1991 and 80,664/1996 also disclose solutions to the problem regarding the burnt deposit. According to the former patent, oxonium anion is added to ink to control the precipitation of burnt ink ingredients, and according to the latter patent, phytic acid or phytate is added to ink to control the precipitation of burnt ink ingredients.

SUMMARY OF THE INVENTION

In the aforementioned ink jet head, the surface of the protective film, on the side which comes into contact with ink, is coated with an anti-cavitation zfilm, which is mainly formed of tantalum (Ta). It has been known that not only is Ta highly resistant to mechanical shock, but also it is relatively corrosion resistant.

In consideration of the fact that the thinner the anti-cavitation film, the higher the efficiency with which heat is conducted from a heat generating element to ink, the anti-cavitation film is desired to be as thin as possible. In recent years, the number of heat generating elements in a recording head has been increased for high quality recording. Therefore, the thickness of the anti-cavitation film tends to be reduced to no more than 0.3 μm from the viewpoint of energy conservation. The provision of such a thin anti-cavitation film upon the exothermic resistant layer, and the usage of the above described ink, result in improvement in terms of the precipitation of burnt ingredients. However, it has also become evident that these measures created new problems. That is, the examination of Ta film after a continuous driving of an ink jet head revealed corrosion of the Ta film. It is thought that the corrosion of the anti-cavitation film formed of Ta occurs through two mechanisms. One mechanism is that cracks are generated at the crystal grain boundaries in the anti-cavity film, and the other mechanism is that Ta itself chemically reacts with the chelating reagent and the like contained in ink. In other words, if chelating reagent (for example, EDTA) is added to ink, that is, if the amount of chelating reagent is increased, the chelating reagent coordinates Ta, which is used as the material for the anti-cavitation film portion of the protective film, causing the protective film to corrode. This sometimes reduces the durability of an exothermic resistant layer. In particular, when a recording head is highly refined, the protective film is also highly refined, or highly reduced in thickness. Therefore, it is possible that even if the surface of the protective film in contact with ink is corroded only slightly, cracks occur in the protective film, and the cracks easily reach the exothermic resistant layer, and damage the exothermic resistant layer. For this reason, the amount of chelating reagent to be added to the ink must be adjusted.

Thus, even though the addition of chelating reagent seems to make some degree of improvement regarding the durability of a heat generating element and the problem of the burnt deposit, it does not seem to be the fundamental solution to the above described problems.

Thus, the inventors of the present invention analyzed in detail the factors which caused the above described problems, that is, the precipitation of burnt ink ingredients, inconsistency in ink ejection, and reduction in the durability of the heat generating element, and the like. As a result, it was discovered that there was a method for comprehensively solving these problems.

That is, in the past, it has been presumed that the above described problems are closely related to the physical properties of ink, driving conditions, and the like, and therefore, there were no simple solutions to them. However, the studies made by the inventors of the present invention regarding the causes of the precipitation of burnt ink ingredients and the destruction of the heat generating element while paying attention to the surface on which the burnt ink ingredients precipitate revealed that the amount by which the burnt deposit was generated was dependent upon the highest temperature to which the surface of the protective film in contact with ink reached. Further, the studies regarding at what level the highest temperature should be set revealed the following. When the highest temperature was set at 600° C. or 700° C., that is, the temperatures set in the conventional methods, it was observed that burnt ink ingredients precipitated, and/or that the wiring of the heat generating element broke due to the precipitation of the burnt ink ingredients and/or the melting of the protective layer. However, lowering the highest temperature produced better results; it was discovered that when a sufficient amount of thermal energy was supplied to ink while maintaining the temperature of the aforementioned surface at no higher than 560° C., ink was consistently ejected, with the precipitation of the burnt ink ingredients satisfactorily controlled. In other words, it was discovered that keeping the highest temperature of the aforementioned surface of the protective layer at no more than a predetermined level not only contributed to the controlling of the precipitation of the burnt ink ingredients, but also contributed to the prevention of the corrosion of the protective film, making it possible to provide an ink jet head base board, an ink jet head, and an ink jet recording method, which were superior in comprehensive terms.

Further studies made by the inventors of the present invention revealed that in order to keep the temperature of the aforementioned protective layer surface no higher than 560° C., the thicknesses and thermal conductivities of the various layers of the protective film, and the voltage and width of the pulses applied to drive the exothermic resistant layer, had to be controlled; in particular, when the protective film was very thin and was excellent in thermal conductivity, controlling the width and voltage of the driving pulses was one of the essential solutions to the above described problems. Thus, the inventors of the present invention created a mathematical model based on the structure of an actual heat generating head, and simulated printing operations, in which the highest temperatures which the aforementioned surface reached were precisely obtained while varying the driving pulses. As a result, the present invention was completed, which could provide an ink jet head base board, an ink jet head, and an ink jet recording method, which could assure that the aforementioned highest temperature would be kept no higher than 560° C.

As described above, the primary object of the present invention is to provide an ink jet head base board, an ink jet head, and an ink jet recording method, which comprehensively solve the aforementioned problems: the precipitation of burnt ink ingredients, inconsistency in ejection, and shortening of the length of the durability of a heat generating element.

According to an aspect of the present invention, there is provided an ink jet recording method of ejecting ink using an ink jet head substrate provided with a heat generating resistor which is coated with a protecting film, wherein the ink is ejected by a pressure produced by generation of a bubble created by film boiling of the ink caused by application of thermal energy to the ink through the protecting film, the thermal energy being generated by driving of said heat generating resistor, the improvement residing in that there is provided a recording mode in which the ink is ejected with a maximum temperature at the surface of said protecting film which is contacted to the ink not higher than 560° C.

According to another aspect of the present invention, there is provided an ink jet head comprising an ink jet head substrate including a heat generating resistor, a protecting film with which said heat generating resistor is coated, wherein heat generated by said heat generating resistor is applied to ink through said protecting film to create a bubble in the ink, thereby to eject the ink by a pressure by the creation of the bubble, the improvement residing in that a maximum temperature at a surface of said protecting film contacted to the ink is not higher than 560° C. during driving of said heat generating resistor.

According to a further aspect of the present invention, there is provided an ink jet apparatus which includes an ink jet head comprising an ink jet head substrate including a heat generating resistor, a protecting film with which said heat generating resistor is coated, wherein heat generated by said heat generating resistor is applied to ink through said protecting film to create a bubble in the ink, thereby to eject the ink by a pressure by the creation of the bubble, the improvement residing in that there is provided driving signal control means for making a maximum temperature at a surface of said protecting film contacted to the ink not higher than 560° C. during driving of said heat generating resistor.

According to the present invention, the highest temperature which the protective film surface is allowed to reach is set at a temperature no higher than 560° C., not only are the ink ingredients prevented from precipitating, as burnt deposit, on the surface (heat transmission surface) of a heat generating element, but also the protective film is prevented from being shaved away. Therefore, even when the exothermic resistant layer is further reduced in thickness and size, and therefore, the amount of the thermal energy generated by the exothermic resistant layer becomes smaller, the problem that the thermal energy is prevented from being efficiently transmitted, by the accumulation of burnt ink ingredients, can be controlled to make it possible to form highly precise images of high quality, as well as to provide an ink jet head base board and ink jet head, which are superior in ejection consistency and durability.

With the application of the present invention, even when chelating reagent was added to ink, the precipitation of burnt ink ingredients could be controlled and the corrosion of the protective film could be prevented, as long as the highest temperature of the surface of the protective film in contact with ink kept no higher than 560° C.

Incidentally, when adding chelating reagent to ink, if the amount of the chelating reagent added to ink is greater than a certain value, the chelating reagent sometimes settles because of the solubility of the chelating reagent, whereas if it is smaller than a certain value, the chelating reagent does not show its effects. Thus, the amount of the chelating reagent is desired to be no less than 50 ppm in weight and no more than 20 wt. %, preferably, no less than 80 ppm in weight and no more than 10 wt. %, relative to the entirety of the ink.

The degree of protection offered to anti-cavitation film against corrosion by the present invention is far greater compared to that offered by the conventional methods. However, in order to further improve the corrosion protection for the protective film, that is, in order to protect the protective film from a larger variety of inks, the aforementioned layer of the protective film which makes contact with ink, that is, the anti-cavitation film, may be formed of amorphous alloy containing Ta. Further, the amorphous alloy for the anti-cavitation film may contain no less than one material among Fe, Cr, and Ni, in addition to Ta. Incidentally, the aforementioned amorphous alloy was composed of Ta, Fe, Cr, and Ni, and when the amount of Ta relative to the entirety of the amorphous alloy was no more than 30% in weight, the amorphous alloy was more effective.

There are no crystal grain boundaries in the anti-cavitation film formed of this amorphous alloy containing Ta. Therefore, the anti-cavitation film does not sustain the cracks which might otherwise occur. Further, the surface of the amorphous alloy containing Ta becomes passive by being oxidized, and this passive state prevents the anti-cavitation film from reacting with ink ingredients. For these reasons given above, anti-cavitation film formed of amorphous alloy containing Ta has more resistance to the corrosion caused by ink, compared to the conventional anti-cavitation film. According to the present invention, the highest temperature of the surface of the protective film in contact with ink is kept no higher than 560° C., which alone is effective to keep the corrosion of the anti-cavitation film under control. However, according to the present invention, an additional measure is taken, that is, the anti-cavitation film is formed of amorphous alloy containing Ta, and therefore, the corrosion of the anti-cavitation film is better controlled because of the synergistic effects of the lower temperature and usage of amorphous alloy containing Ta.

The amorphous alloy as the material for the anti-cavitation film may be produced using no less than one kind of metal among Fe, Cr, Re, Ge, and Ni, in addition to Ta. Further, using four kinds of metallic materials, that is, Ta, Fe, Cr, and Ni as the materials for the anti-cavitation film, in such a ratio that Ta occupies no more than 30% in weight of the entirety of the finished alloy, improves the Ta containing alloy in terms of the above described beneficial characteristic, making it possible to better control the corrosion of the anti-cavitation film, and also to extend the service life of a heat generating element.

In other words, it becomes possible to extend the length of the service life of a recording head to a degree that it virtually matches that of an ink jet recording apparatus, eliminating the need for recording head replacement.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Figure 1:
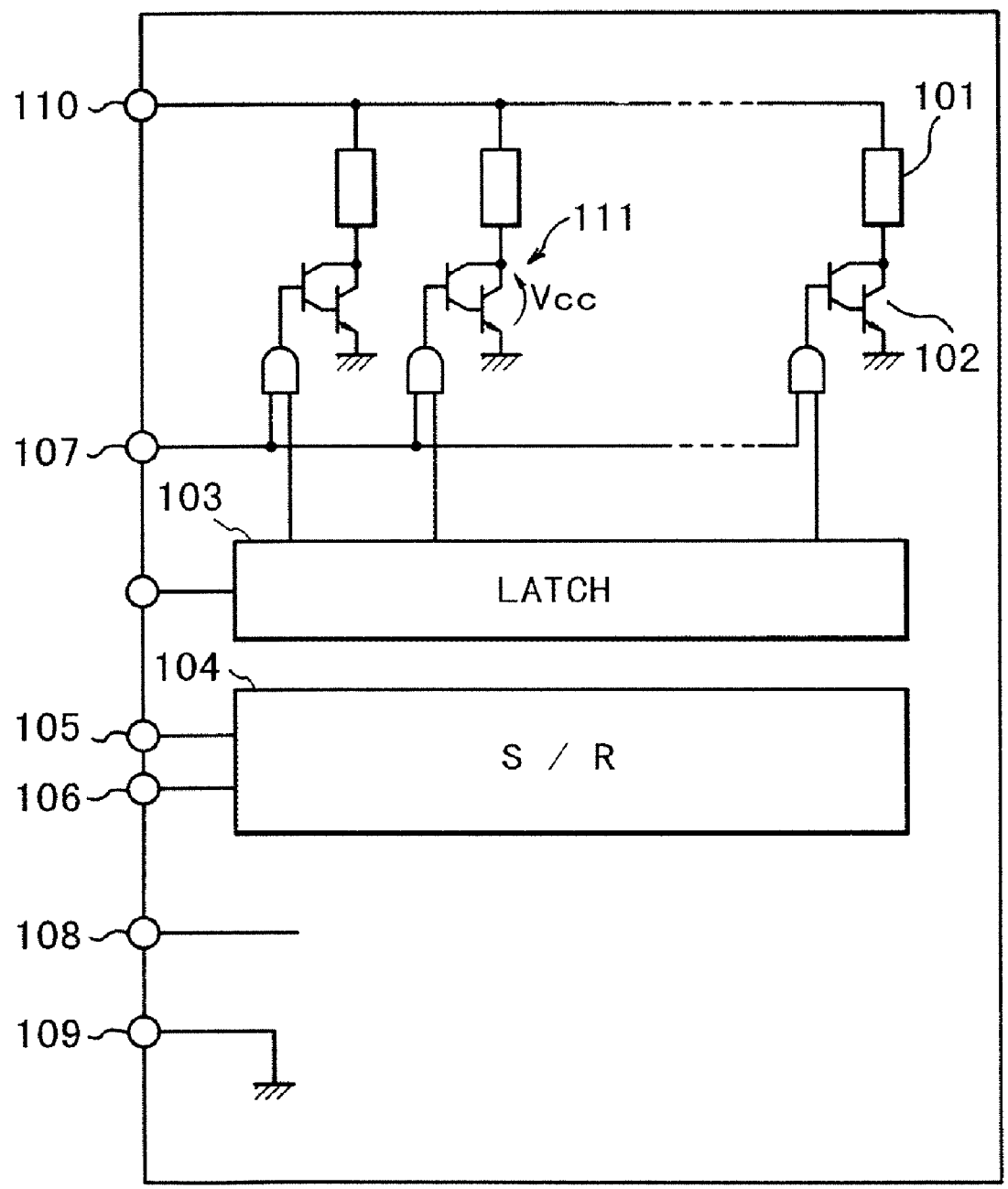
FIG. 1 is a plan view of the circuit configuration of the base board of a recording head in accordance with the present invention.

Hereinafter, the preferable embodiments of the present invention will be described in more detail. The embodiments of the present invention are not limited to those which will be described hereinafter. The application of the present invention to an ink jet recording method in a manner represented by the following embodiments of the present invention enhances the already superior characteristics of the ink jet recording method.

(Upper Limit of Temperature)

First, the highest temperature reached by the interface between the protective film and ink during the printing operation simulation carried out for the completion of the present invention will be described. The amount P of the thermal energy released by the exothermic resistant layer per unit of time satisfies the following mathematical formula:

$$P = V^2/(R+r) \times P_w \times N \quad (1)$$

V: driving voltage [V]
R: resistance value of exothermic resistant layer [Ω]
r: resistance of wiring electrically connected to exothermic resistant layer [Ω]
$P_w$: width of driving pulse [μsec]
N: total number of sub-layers in the exothermic resistant layer.

The resistance value R of the exothermic resistant layer can be calculated using the following formula:

$$R = \rho s \times LH/WH \quad (2)$$

ρs: resistance value of exothermic resistant layer [Ω/□]
LH: length of exothermic resistant layer [μm]
WH: width of exothermic resistant layer [μm]

The maximum value W of electrical power consumed by the exothermic resistant layer per unit area and per unit time can be expressed in the form of:

$$W = P/LH/WH \quad (3)$$

The amount of the thermal energy generated in the exothermic resistant layer can be adjusted based on the actual size of the exothermic resistant layer, and the relationship among the above formulas (1)-(3).

Further, the temperature T at the interface between the surface of the protective film and ink while thermal energy is generated can be obtained by solving a linear equation (4) using difference calculus.

$$\rho C(\partial T/\partial t) = k(x)(\partial 2T/\partial 2t) + P \quad (4)$$

ρ: average density of protective film [kg/m³]
C: average specific heat capacity [J/(kg·C)]
K(x): thermal conductivity of protective film at point x [W/(μm·C)
t: time (μsec)
x: distance from referential point (x=0), or position of bottom surface of protective film, in direction in which sub-layers of protective film are accumulated [μm]
P: thermal energy [W]

The change in the temperature T was simulated by numerically solving Equation (4) under a predetermined initial condition. As a result, it was discovered that the temperature T could be kept no higher than 560° C. by thinning the protective film in order to shorten the heat conduction time, or by narrowing the driving pulse width in Equation (1), for example.

These methods can be carried out independently, in combination, or in combination with additional parameters (for example, driving voltage).

However, thinning the protective film beyond a certain thickness is not desired, because it reduces the durability of the protective film. In consideration of the above concerns, the thickness of the protective film is desired to be made to be no less than 0.1 μm and no more than 2.0 μm, preferably, no less than 0.3 μm and no more than 1.0 μm, so that the temperature T can be kept no higher than 560° C. while supplying a sufficient amount of thermal energy.

Further, the inventors of the present invention discovered that under a condition that the driving voltage was within a range from a voltage level equal to the threshold voltage for causing ink to boil, to a voltage one and a quarter times the threshold voltage, a sufficient amount of thermal energy could be supplied, while keeping the temperature T no higher than 560° C., by making the width of the driving pulse no more than 5 μsec, preferably, no more than 3 μsec.

(Recording Head)

The recording head in this embodiment comprises: a plurality of heat generating heads; a plurality of ink paths connected one for one to the heat generating heads, and a single or plurality of ink chambers for supplying ink paths with ink. Each heat generating head comprises: an exothermic resistant layer formed on a piece of substrate, a driver for driving the exothermic resistant layer areas one for one, and the protective film. The recording head also comprises a recording head base board, which comprises: a plurality of orifices through which ink is ejected; an ink ejecting portion having a plurality of ink paths inclusive of the heat generating heads, that is, the areas where thermal energy acts on ink; and a plurality of the areas of exothermic resistant layer as means for generating thermal energy.

As for the recording head circuit, various circuits have been developed. Some of the recording head circuits are formed on a single piece of substrate, and integrally comprise: a plurality of exothermic resistant layer areas aligned in a predetermined manner; a plurality of drivers provided one for one for the plurality of exothermic resistant layer areas in order to drive them according to image formation data; a shift register, the bit count of which equals the number of the exothermic resistant layer areas, and which parallelly outputs the serially inputted image formation data to the plurality of drivers; and a latching circuit for temporarily storing the data outputted from the shift resistor.

FIG. 1 illustrates a recording head circuit such as the one described above, on the recording head substrate. In FIG. 1, a referential numeral 101 designates each of the exothermic resistant layer areas aligned in a straight line. A referential numeral 102 stands for each of the power transistors, and a referential numeral 103 stands for a latch circuit. A referential numeral 104 stands for a shift resistor, and a referential numeral 105 stands for a clock for activating the shift resistor 104. Referential numerals 106 and 107 designate an image formation data input portion, and a heat pulse width input portion for externally controlling the ON-time of the power transistor, respectively. Referential numerals 108 and 109 stand for a logic power source and a GND, respectively. Referential numerals 110 and 111 designate an exothermic resistant layer driving power source (VH), and a power transistor (Vce), respectively.

In a printing apparatus having a head containing a recording head circuit structured as described above, the image formation data are serially inputted to the shift register 104 from the image formation data input portion 106. The inputted data are temporarily stored in the latch circuit 103, and while they are temporarily stored, pulses are inputted from the heat pulse width input portion 107. As the pulses are inputted, the power transistors 102 are turned on, the exothermic resistant layer areas 101 are driven, the ink within the liquid paths connected to the driven exothermic resistant layer areas 101 is heated and ejected through the ejection orifices; in other words, a print is produced.

The employment of a circuit structured as described above makes it possible to substantially reduce the driving pulse width, which in turn makes it possible to raise the driving voltage V while keeping the temperature T no higher than 560° C., so that the thermal energy applied to ink is kept constant. As a result, ink can be consistently ejected. Next, an example of an element in which the above described circuit has been realized will be described with reference to FIGS. 2 and 3.

Figure 2:
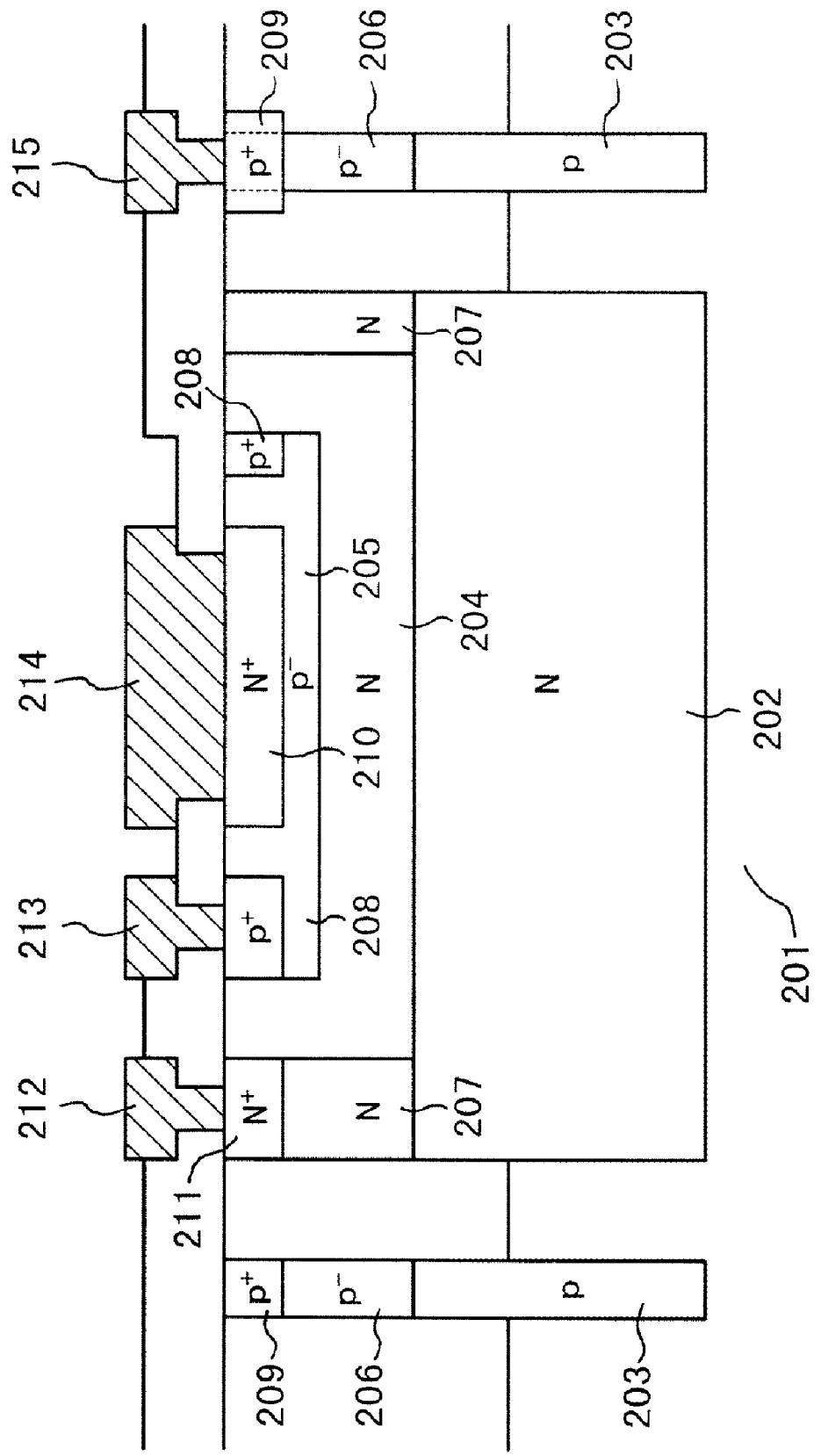
FIG. 2 is a sectional view of the circuit elements of a recording head in accordance with the present invention.

FIG. 2 is a sectional view of an example of an element in which the circuit illustrated in FIG. 1 has been realized. A referential numeral 201 designates a P-type silicon substrate; 202, an embedded N-type collector; 203, an embedded P-type element isolator region; 204, an N-type epitaxial region; 205, P-type base region; 206, an embedded P-type element region; 207, an embedded N-type collector region; 208, a high density P-type base region; 209, a high density P-type element isolation region; 210, an N-type emitter region; 211, an N-type collector region; 212, a collector electrode; 213, a base electrode; and a referential numeral 214 designates an emitter electrode.

Figure 3:
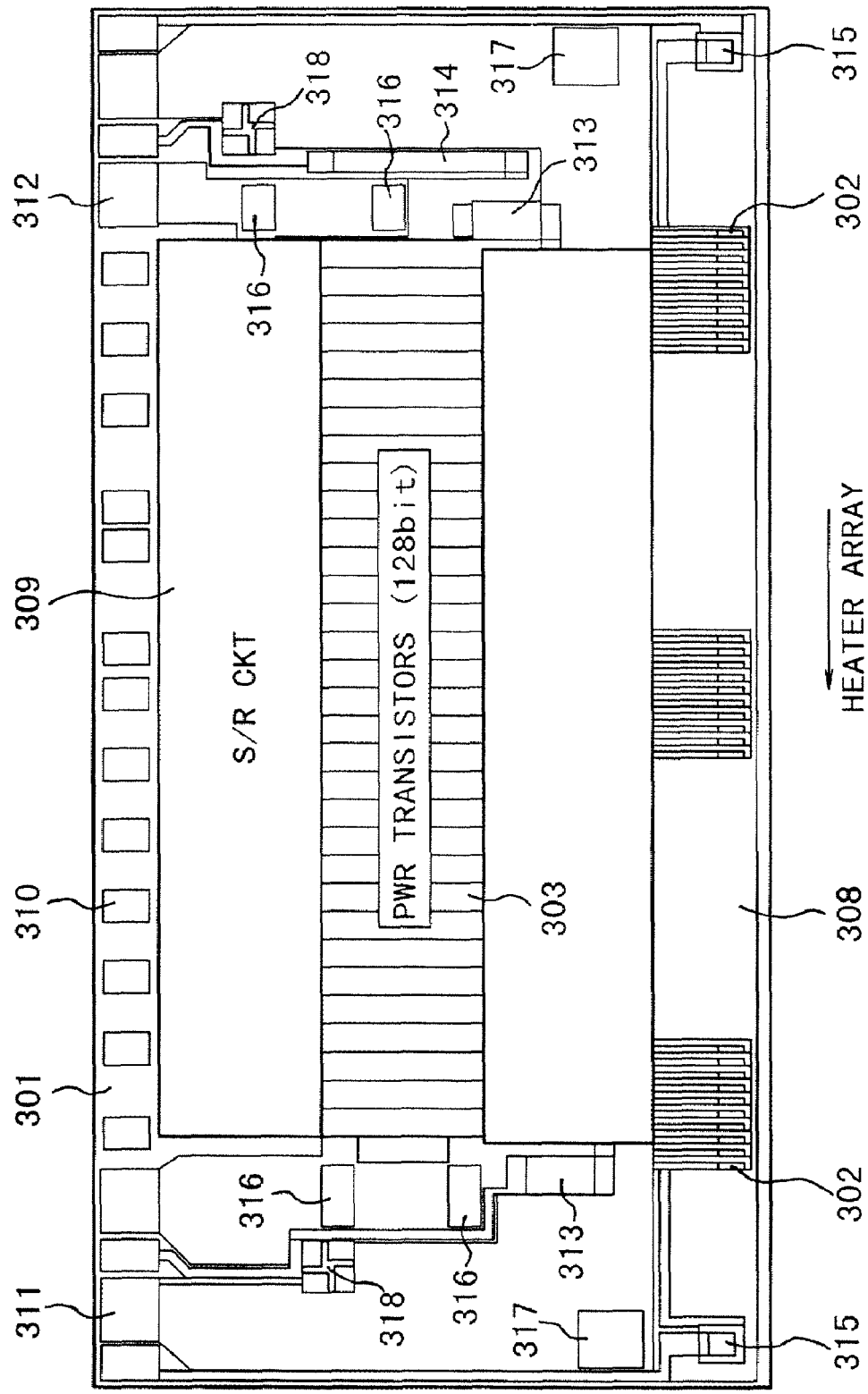
FIG. 3 is a plan view of the circuit elements of a recording head in accordance with the present invention.

FIG. 3 is a plan view of an example of an element in which the circuit illustrated in FIG. 1 has been realized. A referential numeral 301 stands for a piece of electrically insulative substrate. One of the edge portions of the substrate 301 is provided with a plurality of exothermic resistant layer areas 302, which are parallelly aligned along the edge. Each exothermic resistor area 302 is placed in a liquid path, adjacent to the end, or the outlet, of the liquid path. Placed in the approximate center portion of the substrate 301 are power transistors 303, as the transistors for driving the exothermic resistant layer areas 302 one for one, which are placed in such a manner that their longer edges become parallel to each other, and their shorter edges become aligned in the direction perpendicular to the longer edges of the exothermic resistant layer areas 302. In this embodiment, the power transistors 303 are bipolar transistors, and are characterized in that they are aligned in a single layer and in a straight line, in such a manner that their longer edges become parallel to each other, and their shorter edges become aligned in the direction perpendicular to the longer edges of the exothermic resistant layer areas 302. In order to drive the exothermic resistant layer areas, the same number of power transistors as that of the exothermic resistant layer areas 302 are necessary; each exothermic resistant layer area needs one power transistor. In another edge portion of the substrate 301, that is, the edge portion on the side opposite to where the exothermic resistant layer areas 302 are arranged, an S/R circuit 309 comprising a shift register and a latch portion is placed, along with a plurality of input signal pads for the S/R circuits 309, in the adjacencies of the cluster of the aforementioned power transistors 303, the signal pads being on the edge side. A referential numeral 311 stands for a +VII common wiring for applying a predetermined voltage to the exothermic resistant layer areas 302, and a referential numeral 312 stands for a GND. At both longitudinal ends of the cluster of the power transistors 303 in terms of the direction in which the power transistors 303 are parallelly aligned, a heater 313 for temperature adjustment is provided, and in the adjacencies of one of the heaters 313, a sub-heater 314 is provided. Further, a pair of temperature sensing diodes 315 are placed in the corner portions the substrate 301, corresponding to both longitudinal ends of the aforementioned cluster of exothermic resistant layer areas 302, one for one.

In this embodiment, these temperature sensors read the temperature of the substrate, and the data obtained by the temperature sensors are sent to a RAM (unillustrated) disposed within the ink jet recording apparatus. After being sent to the RAM (unillustrated) in the ink jet recording apparatus, the data are referenced to a temperature table stored in the ROM, and an optimum pulse input value is selected. The selected value is transmitted as Heat data (signal) into the ink jet head. It should be noted here that even if the pulse width is kept the same, it is impossible to keep the highest temperature of the heater surface at no higher than 560° C. if the temperature of the substrate varies. Normally, the substrate temperature varies within a range of 15° C. -80° C., and therefore, the temperature difference ΔT is 65° C. at most.

As described above, a table for calculating the highest temperature (Temp), which the heater surface reaches, in relation to the pulse input to the heater (assuming that voltage is constant), and based on the value (Base) read by the sensors, is stored within the RAM.

The highest reached temperature (Treal) referred to by the present invention is obtained by the following equation:

$$\text{Treal}=\text{Base}+\text{Temp}. \quad (5)$$

wherein Temp is obtained as T in Equation (4) given above.

If Treal exceeds 560° C., a stop signal (Emerg) is issued from the RAM, and as a result, the signal transmission from the recording apparatus to the ink jet head is interrupted (Heat, Block, Idata, etc.,).

As the number of the substrate temperature data (Base) sent from the temperature sensor diodes once for every predetermined length of time reduces to a level at which Treal is no higher than 560° C., the data transmission is restarted. Incidentally, in the case of a printer, such as a serial printer, which forms an image line by line, even if Emerg is issued, the data transmission is not stopped until the line being printed is completed.

In such a case, the surface temperature of the heater sometimes exceeds 560° C., but such incidents have been known to have no significant effect upon the overall service life.

The substrate 301 is provided with four through holes 316 and two through holes 317. The four through holes 316 are located one for one at the four corners of the cluster of the second power transistors 303, and the two through holes 317 are located adjacent to the aforementioned diodes 315, one for one. These through holes 316 and 317 are provided for making contact with two wiring layers disposed below. Disposed one for one at the longitudinal ends of the cluster of the second power transistors 303 in terms of the alignment direction of the power transistors 303 are a pair of marks 318 used for position detection during assembly.

Figure 4:
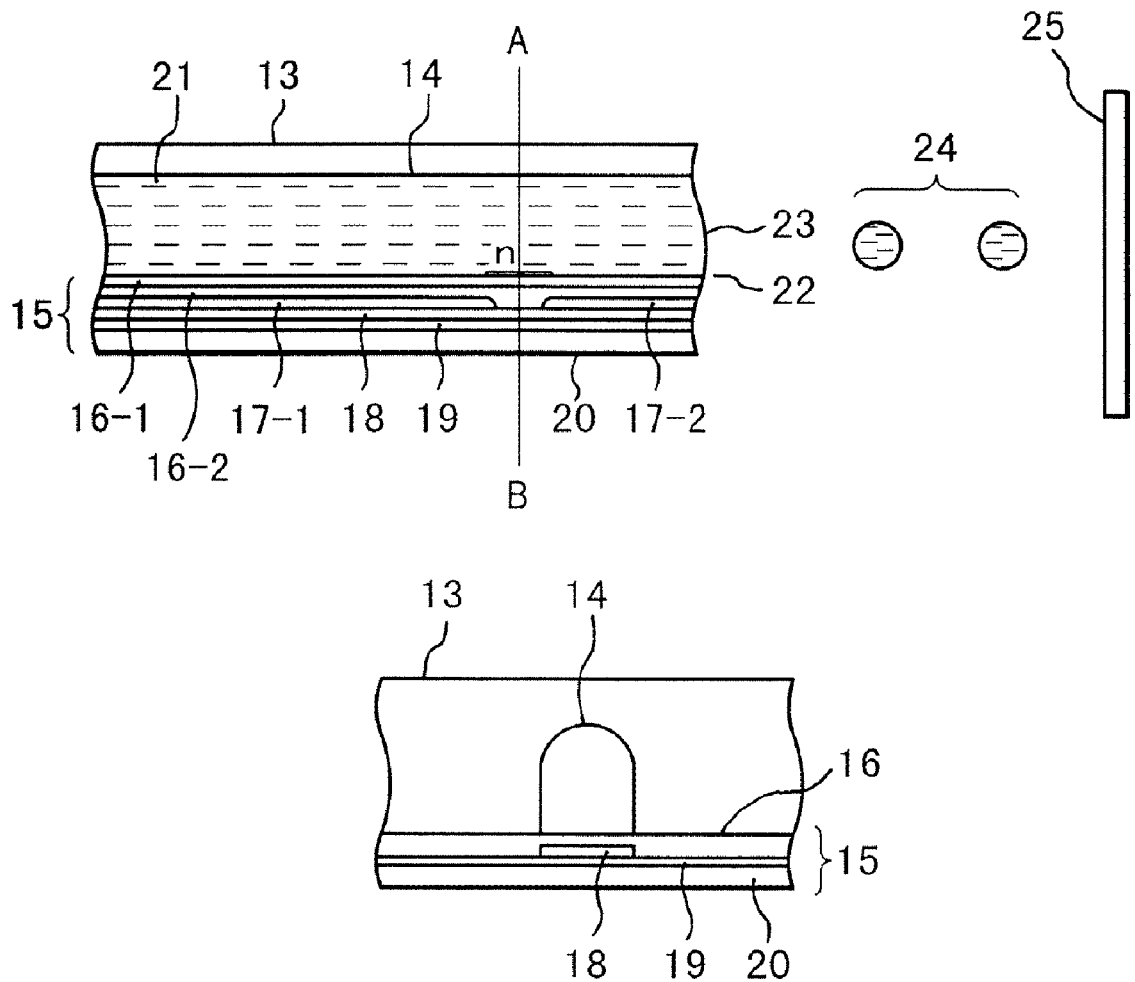
FIG. 4 is a sectional view of a heat generating head in accordance with the present invention.

FIG. 4 offers a schematic sectional view of an example of a recording head equipped with heat generating heads in accordance with the present invention, at the vertical plane which divides one of the orifices into equal longitudinal halves. It also offers a sectional view thereof, at a plane A-B in the first schematic sectional view. A recording head 13 is formed by bonding a glass, ceramic, or plastic plate having a plurality of grooves 14 for forming ink paths, to a heat generating head 15. The heat generating head 15 comprises a plurality of layers of films: an anti-cavitation film layer 16-1 formed of amorphous alloy containing Ta; a protective film layer 16-2 formed of silicon oxide or silicon nitride; an aluminum electrode layer containing electrodes 17-1 and 17-2, a heat generating film layer 18 formed of TaN or the like, a heat storage film layer 19, and supporting layer 20 formed of alumina or the like superior in heat radiation, which are listed in order from the side which makes contact with the ink. The protective film layer comprises two sub-layers: the anti-cavitation film layer 16-1 and the protective layer 16-2. In order to assure that a sufficient amount of thermal energy was supplied to the ink while keeping the temperature of the surface of the anti-cavitation film 16-1 and the ink no higher than 560° C., and also in order to assure the durability, the overall thickness of the protective film was made to be 0.7 μm, for example. Further, in order to make the anti-cavitation film sufficiently resistant to corrosion, the anti-cavitation film was formed of amorphous alloy containing Ta, for example, Ta18Fe57Ni8Cr17.

Ink 21 reaches as far as the ejection orifices 22, forming a meniscus 23 with a predetermined amount of pressure. As an electrical signal is applied to the aluminum electrode 17, a region n of the heat generating head 15 suddenly generates heat, and the portion of the ink 21 in contact with the region n boils, that is, generates a bubble. As a result, the meniscus 23 is caused to protrude outward by the pressure from the bubble. Eventually, a certain amount of ink 21 is ejected in the form of an ink droplet 24 by the pressure from the bubble, from the orifice toward a piece of recording medium 25, for example, a sheet of paper. The ejected ink droplet 24 flies to the recording medium 25 and adheres to the image formation area of the recording medium 25, to form a microscopic section of an image.

Figure 5:
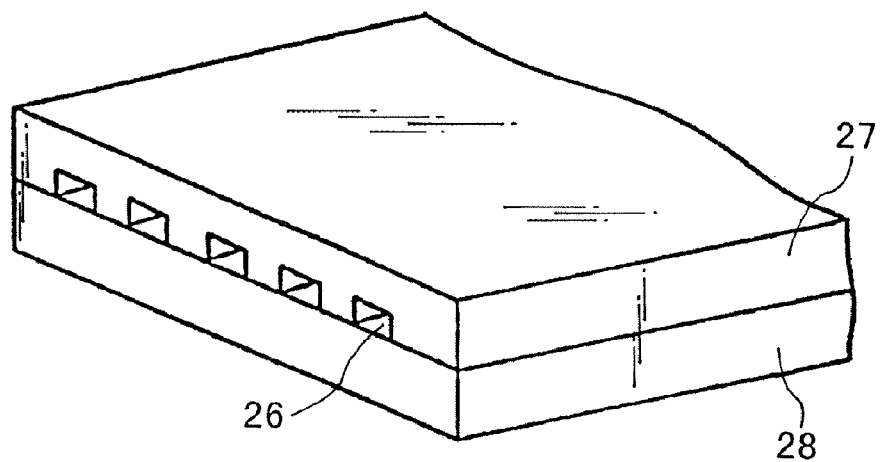
FIG. 5 is a schematic perspective view of a recording head with multiple heat generating heads, and depicts the general structure thereof.

FIG. 5 is an external perspective view of an example of a multi-heating unit head, or a heating head in which multiple heating units are parallelly arranged, in accordance with the present invention. This multi-heating unit head is formed by airtightly bonding a glass plate 27 having multiple grooves 26, to the heating head substrate.

In the present invention, there is no restriction concerning orifice size and the like, and therefore, they may be optimally determined for desired image quality. However, with the increased demands for higher image quality in recent years, the idea of further reducing orifice size has been studied. More specifically, studies have been conducted to reduce orifice size so that the amount of ink ejected from a single orifice per ejection becomes 0.1-40 pico-liter, preferably, 0.1-30 pico-liter, more preferably, 0.1-25.0 pico-liter. With such a trend, controlling the generation of burnt deposit by keeping the temperature at the interface between the surface of the anti-cavitation film and ink no higher than 560° C. is extremely important for ink to be consistently ejected.

(Driving of Recording Head)

Figure 15:
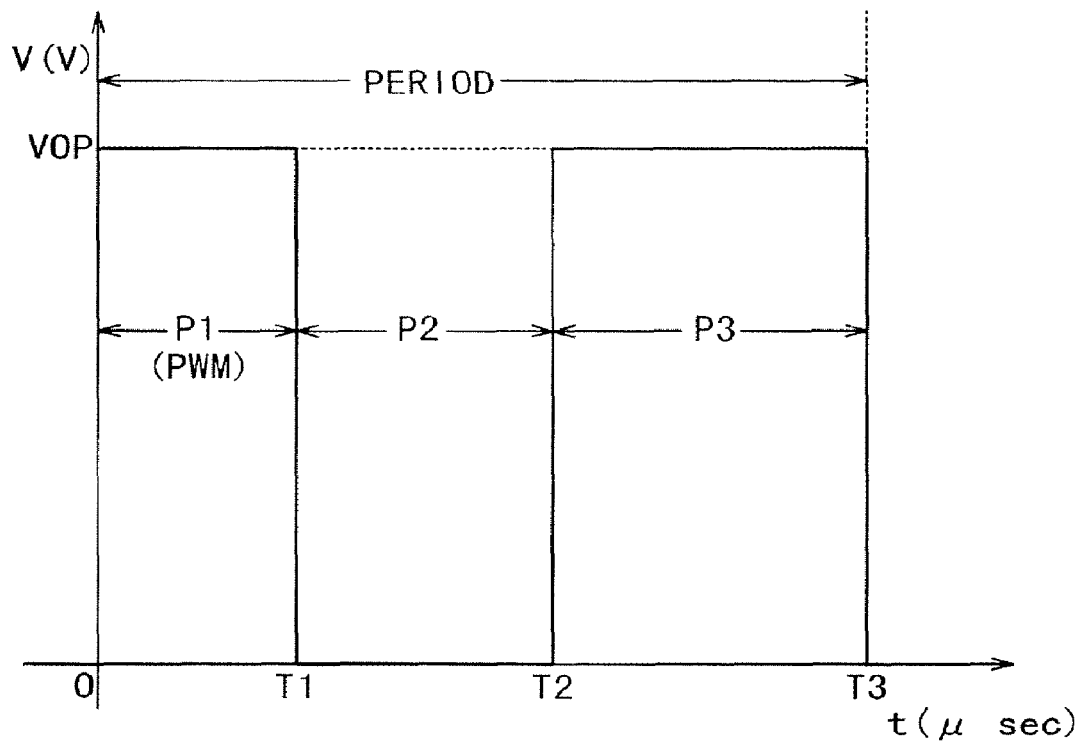
FIG. 15 is a graph which shows the head driving pulse for modulating the ejection amount in one of the embodiments of the present invention.

FIG. 15 is a graph which depicts a split pulse for driving a recording head. In this drawing, VOP stands for the driving voltage level; P1, the pulse width of the first portion (hereinafter, "pre-heat pulse") of the heat pulse split in two portions; P2, an interval time; and P3 stands for the pulse width of the second portion of the pulse (hereinafter, "main heat pulse"). Ti, T2, and T3 represent points of time which correspond to the widths P1, P2, and P3.

The driving voltage level VOP is one of the factors which determine the amount of the electrical energy necessary for an electrothermal transducer, to which voltage is applied, to generate the thermal energy applied to the ink within each of the ink paths formed by the heater board and top plate of the recording head. Its value is determined by the area size, resistance value, and film structure, of the electrothermal transducer, and the liquid path structure of the recording head. A split pulse width modulation driving method sequentially applies the pre-heat pulse portion with the width of P1, interval portion with the width of P2, and main pulse portion with the width of P3, in this order. The pre-heat pulse portion is a portion for mainly controlling the ink temperature within the ink path, and controls the amount of the ink to be ejected. The value of the width of this pre-heat pulse portion is set so that the thermal energy generated by the application of the pre-heat pulse portion to the electrothermal transducer does not generate bubbles in the ink.

The interval time is provided as an interval for preventing the pre-heat pulse and main heat pulse from interfering with each other, and also for making uniform the temperature distribution throughout the ink within the ink path. The main heat pulse is for generating bubbles so that ink is ejected from the ejection orifice, and its width P3 is set according to the area size, resistance value, and film structure, of the electrothermal transducer, and the ink path structure of the recording head.

Figure 16:
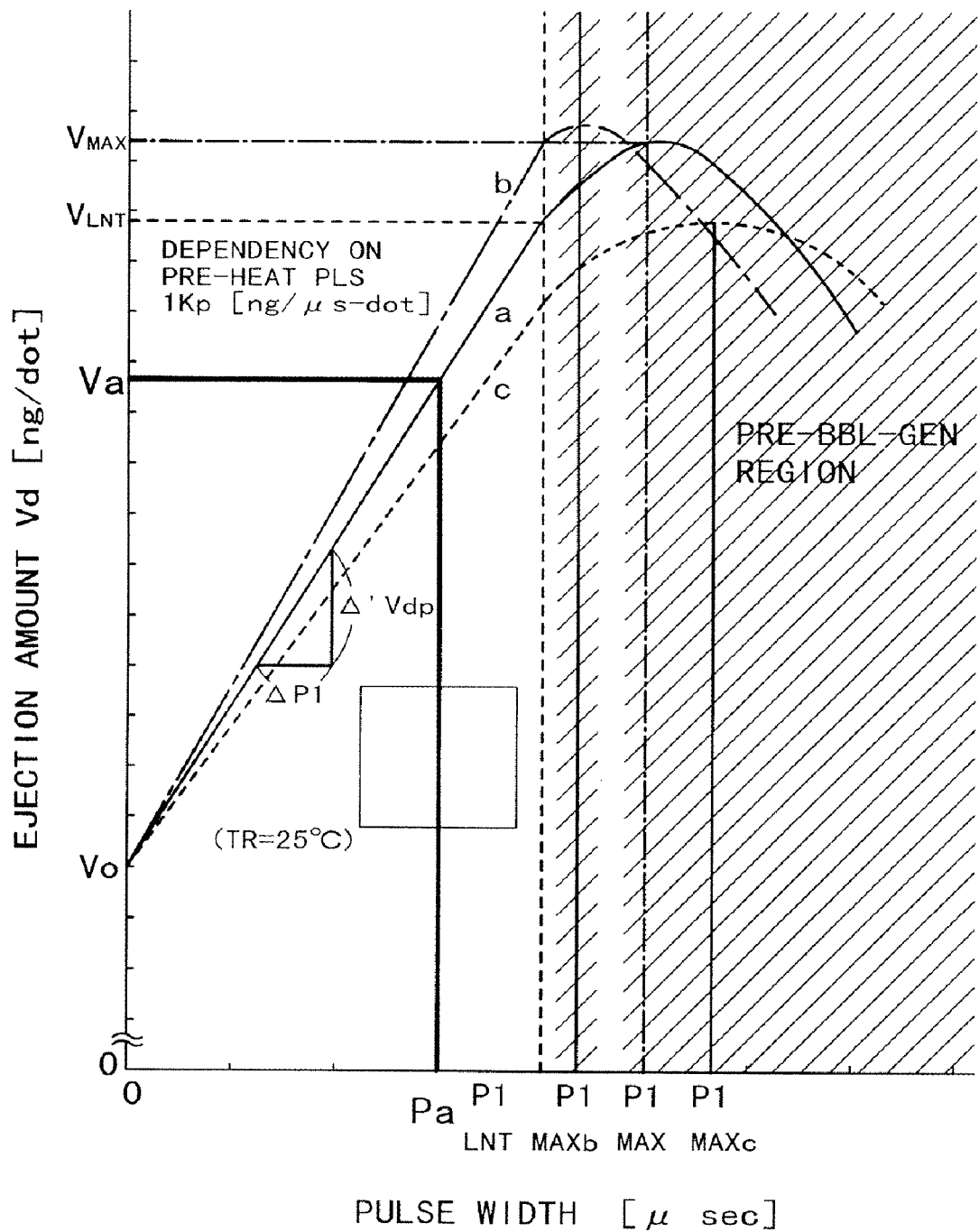
FIG. 16 is a graph which shows the relationship between the width of the driving pulse shown in FIG. 15, and the amount of the ejected ink.

In the recording head in this embodiment, if the pre-heat pulse width P1 is varied within a given range under a condition in which the driving voltage VOP is X (V) (VOP=X), and the main heat pulse width P3 is Y (μsec) (P3=Y), there is a relationship as shown in FIG. 16 between the amount Vd by which ink is ejected, and the pre-heat pulse width P.

FIG. 16 is a graph which shows that the amount by which ink is ejected is dependent upon the pre-heat pulse. In the graph, V0 stands for the amount of ink ejected when P1=0 (μsec). As is indicated by a curved line a in FIG. 16, the amount Vd by which ink is ejected linearly increases within a pulse width P1 range of zero to P1LMT. However, as the pulse width P1 is increased beyond P1LMT, the amount Vd by which ink is ejected reaches its maximum when the pulse width P1 is P1MAX.

As is evident from the above description, the pulse width P range in which the variation in the amount Vd by which ink is ejected, relative to the variation in the pulse width P1 displays linearity, is effective as a range in which the amount by which ink is ejected can be easily controlled by varying the pulse width P1.

In the pulse width P1 range in which P1 is greater than P1MAX, the amount Vd by which ink is ejected is smaller than VMAX. This is for the following reason. That is, as a pre-heat pulse with a pulse width within the above described range is applied, a microscopic bubble is generated on the electrothermal transducer (condition immediately before film boiling begins), and does not disappear before the main heat pulse is applied. As a result, the process in which a bubble is generated by a main heat pulse is disturbed by this microscopic bubble, being reduced in the amount by which ink is ejected. This pulse width P1 range is called a pre-bubble generation range, in which it is difficult to control the amount by which ink is ejected, by way of pre-heat pulse.

Defining the inclination of the straight line representing the relationship between the ejection amount and pulse width within the pulse width range in which P1=0~P1LMT (μsec) as the coefficient of pre-heat pulse dependency, there is the following relationship: coefficient of pre-heat pulse dependency $(KP)=(\Delta VdP)/(\Delta P1)$ [ng/μsec·dot]. This coefficient KP is not dependent upon temperature, and instead is dependent upon head structure, driving condition, ink properties, and the like. The curved lines b and c in FIG. 16 represent other recording heads, showing that each recording head is different from the others in ejection properties.

In this embodiment, the condition in which a recording head in accordance with the present invention is driven in the normal printing mode is that pre-heat pulse P1=Pa (μsec), with which the ejection amount Vd becomes Va when driving voltage VOP=X (V), and main heat pulse width P3=Y (μsec). Under this driving condition, the highest temperature of the recording head does not reach 560° C. while ink is ejected.

In the above described case, the pulse width modulation driving control using double split pulse was employed. However, a multi-split pulse such as a triple split pulse or a pulse with a larger number of splits may be employed. Further, a pulse width modulation driving method in which a non-split pulse is employed and the main pulse width is modulated may be employed. In other words, any pulse width modulation driving method may be employed as long as the highest temperature which the recording head reaches can be kept no higher than 560° C.

In the case of a special printing mode, for example, when large recording dots are necessary, dot size can be increased by increasing the pre-heat pulse width P1 beyond Pa (μsec) so that the ejection amount in FIG. 16 is made greater than Va. During this kind of special mode, the highest temperature which the recording head reaches sometimes exceeds 560° C. However, what is essential here is that the highest recording head temperature should remain below 560° C. during the normal recording mode. Incidentally, the normal recording mode means a mode other than various special modes which are seldom used, and are used only when selected for specific purposes, for example, a mode in which the recording head is driven in a special manner because of the difference in recording medium, or a super high resolution mode.

In some ink jet heads, tone is controlled by varying the volume by which ink is ejected from each orifice. In these ink jet heads, two or more heaters are placed inside each nozzle, and each heater is connected to its own electrode (wiring) so that a specific pulse with specific driving voltage can be applied to each heater. When such control is carried out, the highest temperature on the surface of each heater becomes different from that of the other heater. Further, there are occasions when the value of the pulse inputted for printing in large dots is increased to more precisely control tone to achieve a special effect. On these occasions, the highest temperature sometimes exceeds 560° C. However, it does not matter as long as the highest temperature the surface of each heater reaches during the normal mode is no higher than 560° C.

Assuming that if the anti-cavitation film which constitutes the top layer of each heater is not corroded through the thermochemical reaction between the anti-cavitation film and the chelating agent or the like contained in ink, the length of the service life of a heater based ink jet head is determined only by the cavitation which occurs when a bubble generated by a heater collapses and disappears, a heater based ink jet head can generate a bubble $5 \times 10^8$-$3 \times 10^9$ times before its service life expires. The present invention makes it possible for an exothermic resistant layer to generate a bubble as many times as the number of times given above, even if chelating agent or the like is contained in ink, assuring that a heater based ink jet head remains reliable for a long period.

The ink used in the present invention may contain coloring material, water-soluble organic solvent, water and/or the like, as desired. T coloring material may be water-soluble or not. The water-soluble coloring material may be water-soluble anionic dye, direct dye, acid dye, reactive dye or another water-soluble dye. Particularly, auriferous dye comprising TaN or cobalt has been limitedly used in the recording head using the thermal energy because of the problem of the burnt deposit, but according to the present intention, they are usable with stability. The non-water-soluble coloring material may be pigment, dispersed dye or the like. In the case of the non-water-soluble coloring material, it may contain a dispersion material image it is dispersed.

The ink used with the present invention may contain water-soluble organic solvent as desired. By using the following water-soluble organic solvent, the dissolubility of the components constituting the ink may be improved, and the viscosity may be easily adjusted. Such water-soluble organic solvents include monovalent alcohols such as methanol, ethanol or isopropyl alcohol; ketone orketone alcoholics such as acetone or diacetonealcoholic; ethers such as tetrahydrofuran, diosane; oxyethylene or oxypropylene addition polymers such as diethylene glycol, triethyleneglycol, tetraethyleneglycol, dipropyleneglycol, tripropyleneglycol, polyethylene glycol or polypropylene glycol; alkyleneglycols having alkylene group containing 2-6 carbon atoms such as ethylene glycol, propylene glycol, trimethylene glycol, butylene glycol or hexylene glycol; triols such as 1,2,6-hexane triol; thiodiglycol; glyceline; lower alkyl ethers of polyatomic alcohol such as ethyleneglycolmonomethyl (or ethyl) ether, diethyleneglycolmonomethyl (or ethyl) ether or triethyleneglycolmonomethyl (or ethyl) ether; lower dialkyl ethers of polyatomic alcohol such as triethyleneglycoldimethyl (or ethyl) ether, tetraethyleneglycoldimethyl (or ethyl) ether; sulfolane, N-methyl-2-pyrolidone, 2-pyrolidone, 1,3-dimethl-2-imidazolidinone.

The content of the water-soluble organic solvent is preferably not less than 1 weight % and not more than 30 weight % on the basis of the total weight of the ink, and even preferably, not less than 1 weight % and not more than 25 weight %. With this, the various properties of the ink is better.

In order to provide remarkable effects of the present invention, the water added to the ink is preferably ion exchange water. When they use is made with the ion exchange water, the coloring of the coloring material is not be influenced by the ions, so that color tone of the ink is stabilized. The percentage of the water in the total weight of the ink is preferably not less than 20 weight % and not more than 95 weight %, even preferably not less than 40 weight % and not more than 95 weight %, and even farther preferably not less than 60 weight % and not more than 95 weight %.

The ink used in this invention may be added with chelate agent as desired. The chelate agent may be any if it has coordinating ability, and preferably phosphate type, carboxylic acid type or aminocarboxylic acid type. The phosphate type chelate agent includes tripolyphosphoric acid, 1-hydroxyethylidene-1,1-diphosphonate (HEDP), aminotrimethylenephosphonic (ATMP), or the like and the salt thereof. The carboxylic acid type of chelate agent includes citric acid or the like and salt thereof. The aminocarboxylic acid type chelate agent includes ethylenediamine 4 acetate (EDTA), hydroxyethylenediamine 3 acetate (HEDTA), glycoletherdiamine 4 acetate (GEDTA), nitro 3 acetate (NTA), hydroxyimino 2 acetate (HIDA), hydroxyethylglycin (DHEG), diethylenetriamine 5 acetate (DTPA), triethylenetriamine 6 acetate (TTHA) or the like and salt thereof. From the standpoint of coordinating ability, the phosphate type and the aminocarboxylic acid type are preferable to the carboxylic acid type.

(Ink Jet Recording Apparatus)

Figure 6:
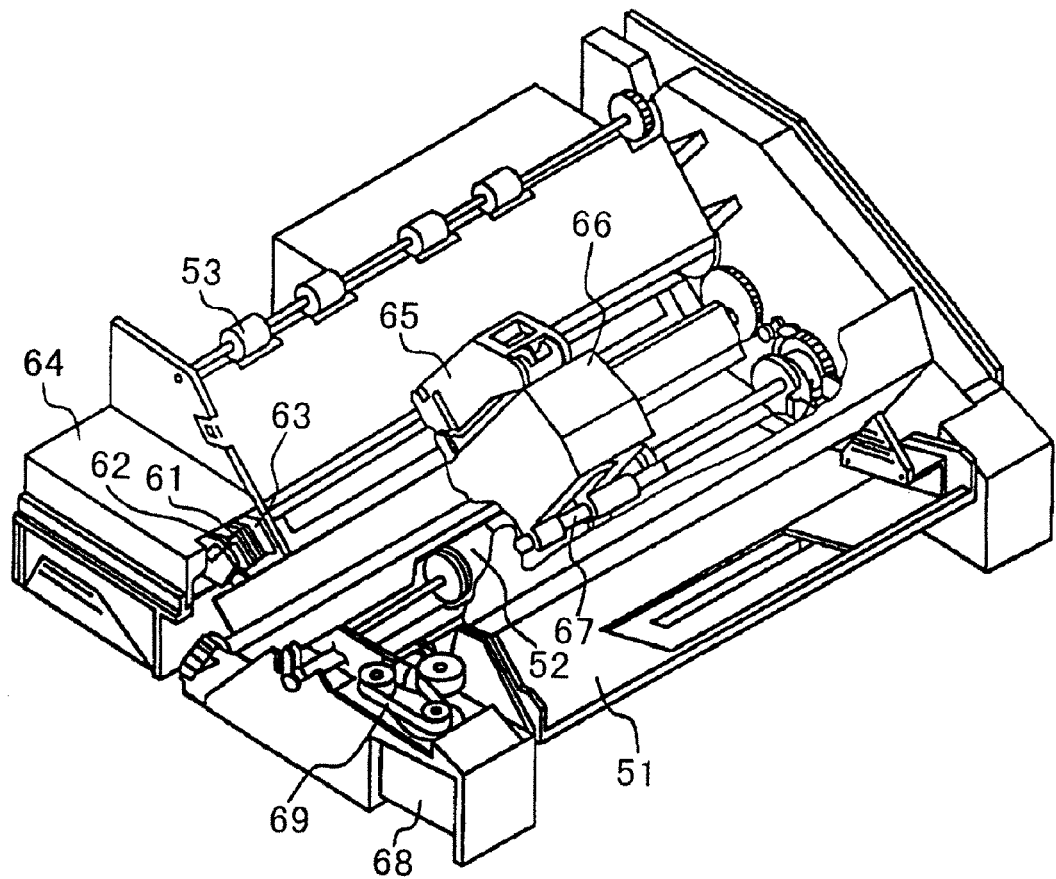
FIG. 6 is a schematic perspective view of an embodiment an ink jet recording apparatus in accordance with the present invention.

FIG. 6 shows an example of an ink jet recording apparatus equipped with a recording head in accordance with the present invention. In the drawing, a referential numeral 61 stands for a blade as a wiping member, which is supported by a blade supporting member in the form of a cantilever; it is attached to the supporting member by one of its edges. The blade 61 is placed at a position next to the recording range of the recording head. In this embodiment, it is supported in a manner to protrude into the moving path of the recording head. A referential numeral 62 stands for a cap, being placed adjacent to the home position which is adjacent to the position of the blade 61. The cap 62 is structured so that it moves in the direction perpendicular to the moving direction of the recording head to make contact with the ejection orifice equipped surface of the recording head. A referential numeral 63 stands for an absorbent member placed next to the blade 61. Like the blade 61, it is supported in a manner to protrude into the moving path of the recording head. The above described blade 61, cap 62, and absorbent member 36 make up an ejection recovery portion 64, which removes the moisture, dust, and the like from the ejection orifice equipped surface by the blade 61 and absorbent member 63. A referential numeral 65 stands for a recording head which has a means for generating thermal energy necessary for ink ejection while keeping the surface temperature of the heat generating element no higher than 560° C., and records images on a sheet of recording medium facing the recording head surface equipped with ejection orifices, by ejecting ink onto the sheet of recording medium. A referential numeral 66 stands for a carriage on which the recording head 65 is mounted to be moved. The carriage 66 is slidably engaged with a guide shaft 67, and a portion of the carriage 66 is connected (unillustrated) with a belt 69 which is driven by a motor 68. With this arrangement, the carriage 66 can be moved along the guide shaft 67; in other words, it can be moved through the recording range of the recording head 65, and the adjacencies thereof. A referential numeral 51 stands for a sheet feeding portion for inserting a sheet or sheets of recording paper, and a referential numeral 52 stands for a sheet conveying roller which is driven by an unillustrated motor. With the provision of the above structural arrangement, a sheet of recording paper is conveyed to a position at which the sheet of recording paper faces the ejection orifice equipped surface of the recording head. With the progress of recording, the sheet of recording paper is conveyed further, and eventually is discharged into a delivery portion equipped with a sheet discharging roller 53.

While the recording head 65 returns to the home position after the completion of a given recording operation, the blade 61 is protruding into the moving path of the recording head, although the cap 62 is kept out of the moving path of the recording head 65. Therefore, the ejection orifice equipped surface of the recording head is wiped. In order to cap the recording head 65, that is, in order to come into contact with the ejection orifice equipped surface of the recording head, the cap 62 moves in a manner to protrude into the moving path of the recording head.

When the recording head 65 moves to the recording start position from the home position, the cap 62 and blade 61 are at the same positions as they are during the wiping of the recording head. Therefore, the ejection orifice equipped surface of the recording head 65 is wiped also during this movement. The above described returning of the recording head to its home position occurs not only immediately after the completion of a given recording operation, or for the ejection recovery operation, but also occurs with predetermined intervals during which the recording head moves to the next recording point across its recording range, and also during this movement of the recording head to the home position adjacent to the recording range of the recording head, the aforementioned wiping of the recording head occurs.

(Ink Cartridge)

Figure 7:
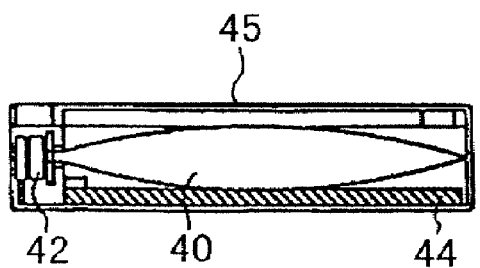
FIG. 7 is a vertical sectional view of an embodiment of an ink cartridge in accordance with the present invention.

FIG. 7 shows an ink cartridge which contains the ink to be supplied to a recording head through an ink supplying member, for example, a tube. In FIG. 7, a referential numeral 40 stands for an ink storage portion, for example, an ink pouch, which holds the ink to be supplied to a recording head. The end of the ink pouch 40 is provided with a rubber plug 42. The ink within the ink pouch 40 is supplied to a recording head by inserting a needle (unillustrated) into the ink pouch 40 through this plug 402. A referential numeral 44 stands for an absorbent member which catches and absorbs the waste ink. As for the ink storage portion, a pouch, in which the surface which comes into contact with ink is formed of polyolefine, in particular, polyethylene, is desirable for the present invention. The selection of recording heads and ink cartridges to be used with ink jet recording apparatuses in accordance with the present invention do not need to be limited to those described above, which are independent from each other. In other words, recording heads integral with an ink cartridge are also usable with the ink jet recording apparatuses in accordance with the present invention, with desirable results.

(Recording Unit)

Figure 8:
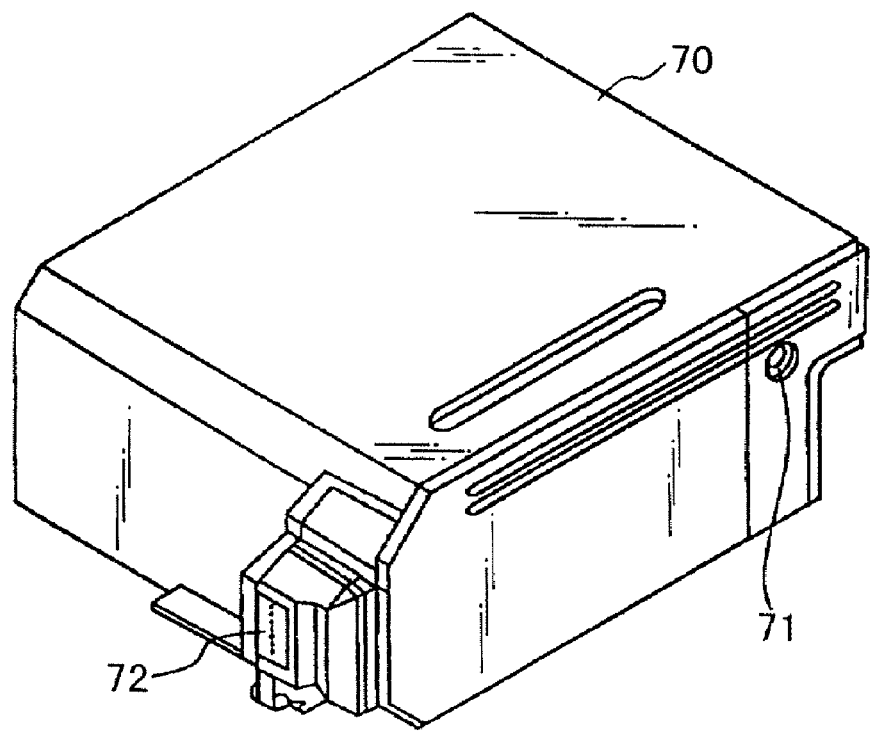
FIG. 8 is a schematic perspective view of an embodiment of a recording unit in accordance with the present invention.

Referring to FIG. 8, a referential numeral 70 stands for a recording unit, which is structured so that an ink storage portion, for example, an ink absorbent member, is stored therein, and the ink within the ink absorbent member is ejected in the form of an ink droplet from the head portion 71 equipped with a plurality of orifices. As to the material for the ink absorbent member, polyurethane is desirable for the present invention. A referential numeral 72 stands for an air vent for allowing the internal space of the recording unit 70 to become connected to the atmosphere. This recording unit 70 can be used in the place of the recording head illustrated in FIG. 4, and is removably mountable on the carriage 66.

(Ink Selection)

Figure 9:
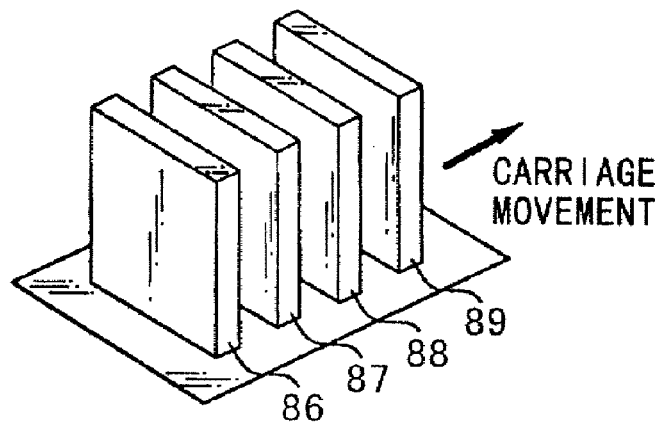
FIG. 9 is a schematic perspective view of a recording head having four ink cartridges.

The present invention is compatible with inks of any color, for example, yellow, magenta, cyan, red, green, blue, or black ink. These inks may be individually used for image formation, or may be used in a combination of two or more inks of different color, for the formation of a color image. Further, two or more inks which are the same in color but different in coloring material may be used in combination to form an image superior in gradation. When forming an image using two or more inks different in color or inks different in coloring material, a recording apparatus such as the one illustrated in FIG. 9, in which four recording heads are aligned on the carriage, may be employed. In FIG. 9, referential numerals 86, 87, 88, and 89 stand for recording heads for ejecting yellow, magenta, cyan, and black inks, correspondingly. Each of these recording heads disposed within the recording apparatus ejects ink in response to recording signals.

Figure 10:
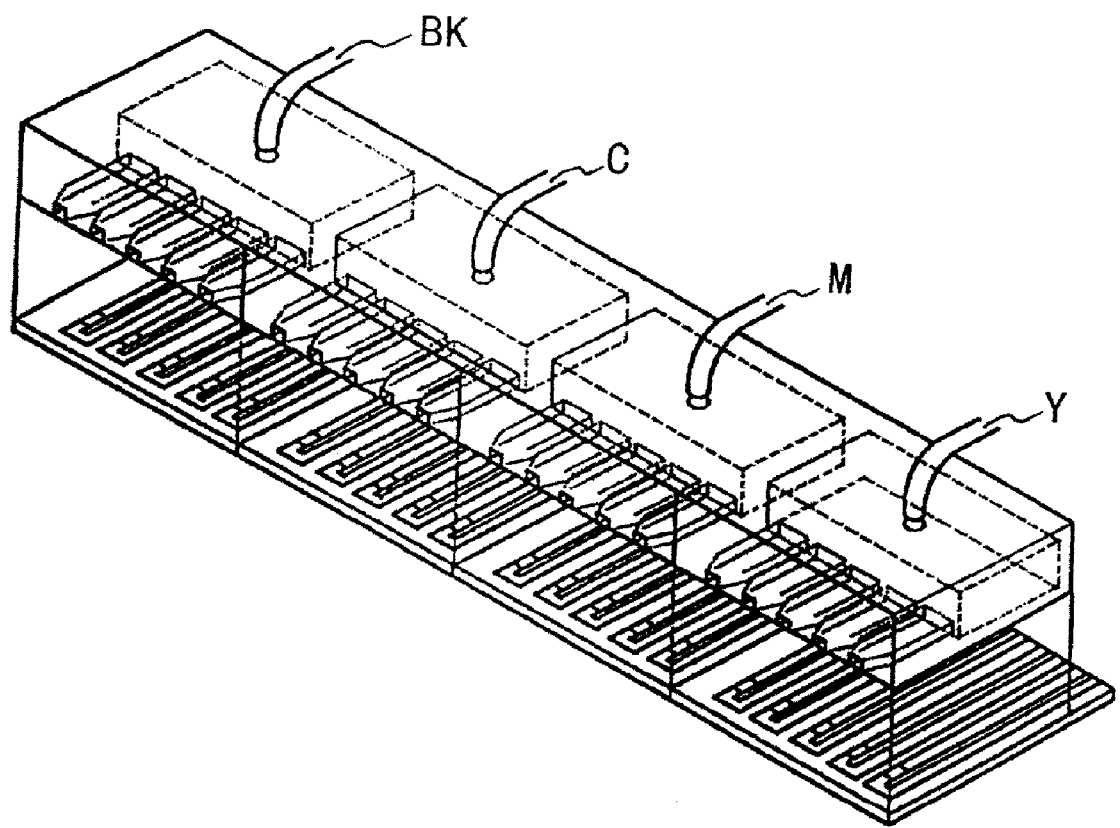
FIG. 10 is a schematic perspective view of a heat generating head and four ink cartridges arranged on the head.

Although FIG. 9 shows a case in which four recording heads are used, the application of the present invention does not need to be limited to this configuration. For example, the present invention is also applicable to a recording head configuration illustrated in FIG. 10, in which the aforementioned four ink cartridges different in ink color are combined with a single head in which ink paths are grouped to form a color image.

EMBODIMENTS

Hereinafter, the present invention will be described in more detail with reference to an embodiment of an ink jet recording method in accordance with the present invention. It should be noted here that the application of the present invention is not limited to the following embodiment.

(Actual Measurement of Highest Temperature)

Figure 11:
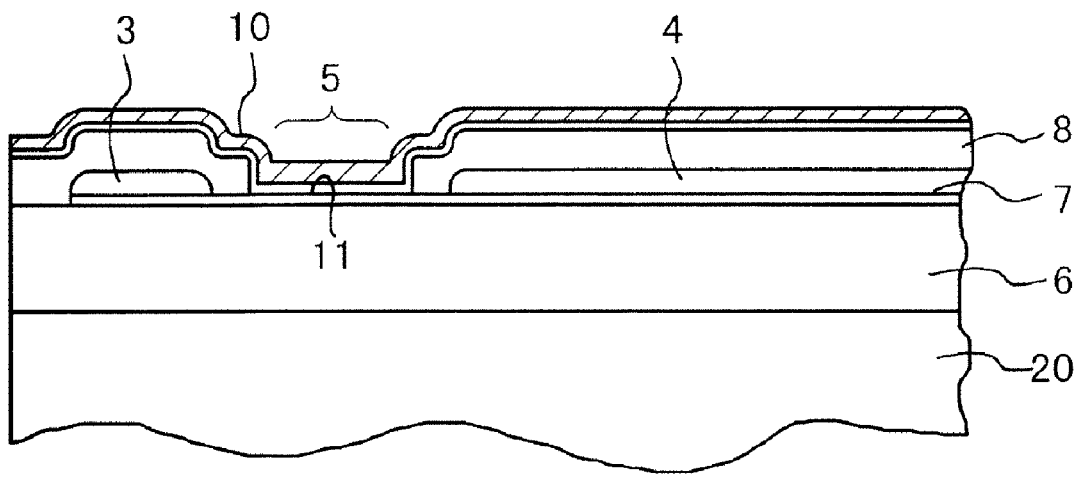
FIG. 11 is a sectional view of an example of a heat generating head in accordance with the present invention.

FIG. 11 is a sectional view of the base plate of the ink jet head in this embodiment. The recording head in this embodiment was produced by bonding a piece of glass plate with grooves for forming ink paths to the ink jet base plate. The ink jet base plate comprised a plurality of film layers: a 0.2 μm thick anti-cavitation layer 10 formed of Ta; a 0.2 μm thick protective layer 11 formed of silicon nitride; an insulative layer 8; an aluminum electrode layer comprising electrodes 3 and 4; an exothermic resistant layer 7 formed of TaN or the like; a heat storage layer 6, and a supporting layer 20 formed of alumina or the like superior in heat radiation, which were listed in order from the side which makes contact with ink. As for the temperature at the interface between the anti-cavitation film 10 and the ink, the surface of the anti-cavitation film, which came into contact with ink, was measured using a Thermo Viewer (product of Nippon Avionix Co., Ltd.) while a heat generating element was driven with no ink on the surface of the heat generating element. This is due to the fact that a state in which the surface temperature of the protective film is at its highest level is also a state in which a bubble is being formed on the protective film surface, and therefore, the surface temperature of the protective film in this state can be approximated by measuring the surface temperature of the protective film with no ink on the protective film surface.

When a driving voltage of 25 V, which was one and half times the threshold voltage necessary to cause ink to boil, and had a pulse width of 2.0 μsec and a frequency of 6 kHz, was applied to the heat generating head shown in FIG. 11, ink boiled desirably, and the highest temperature the protective film surface reached was 545° C.

On the other hand, the resistance value R (T) of the anti-cavitation film 10 is a function of temperature T, and can be expanded with respect to temperature T. Therefore, ignoring the terms greater in power than three, a quadratic equation in which R (T) is the constant term, can be obtained for the temperature T. Thus, the resistance value R (T) of the anti-cavitation film was actually measured when the temperature T was at a give level, and the aforementioned Equation (4), that is, a quadratic equation, was solved by substituting the measured resistance value into Equation (4) to calculate the temperature T. The thus obtained theoretically highest temperature reached by the protective film surface was 540° C., which was substantially equal to the actually measured highest temperature reached by the protective film surface.

Incidentally, in solving Equation (4), until film boiling begins, physical property values of water are inputted, and after film boiling begins, physical property values of air (gas) are inputted. Therefore, the heat insulation effect at the heater surface becomes less than in the actual situation, producing a slightly smaller value.

(Experiment 1)

Ink 1 was formulated by the following method. After the following ingredients (the ingredients listed below) were mixed, and were stirred no less than two hours, the mixture was adjusted to 6 in pH using 10% water solution of sodium hydroxide. Then, the mixture was filtered with a membrane film with a pore diameter of 0.2 μm, obtaining ink 1.

| | |
|---|---|
| C.I. direct blue | 3 wt. % |
| Diethyleneglycol | 10 wt. % |
| Thiodiglycol | 10 wt. % |
| Citric acid | 0.35 wt. % |
| Water | 76.65 wt. % |

The thus obtained ink 1 was ejected $6 \times 10^8$ times from the aforementioned recording head structured so that the amount of ink ejected from each orifice per ejection became 50 picoliter, in each of the tests which were different in the driving condition in terms of the highest temperature reached through the aforementioned simulation. During these tests, precipitation of burnt ink ingredients, consistency in ejection amount, and corrosion of the anti-cavitation film were examined. The results are given in Table 1.

As to the state of the burnt deposit, each recording head was disassembled after $6 \times 10^8$ times of ink ejection, and the anti-cavitation film surface which had made contact with ink was visually examined by an optical microscope.

As to the consistency of ejection amount, an average amount of ink ejected per nozzle after the $6 \times 10^8$ times of ink ejection was obtained, and this value was compared with the initial performance values of each head to evaluate the head performance in the following three grades.

G: no less than 90% compared to the initial amount
F: no less than 80% but no more than 90% compared to the initial amount
N: no more than 80% compared to the initial amount As to the degree of corrosion of anti-cavitation film, a numerical value was obtained as the ratio of the remaining anti-cavitation film after the aforementioned times of ink ejection. More specifically, before and after the aforementioned times of ink ejection, the elemental composition of the center portion of the anti-cavitation film was analyzed by an Electron Probe Micro Analyzer (product of Shimazu Corp.), flowing a current of 40 nA, to calculate the ratio of the remaining anti-cavitation film, based on the ratio of the strength of the signal traceable to Ta within the anti-cavitation film prior to the aforementioned times of ink ejection, relative to that after the aforementioned times of ink ejection. As a current of 40 nA was flowed, not only the elemental composition of the anti-cavitation film, but also the presence of Si in the protective layer below the anti-cavitation layer, were detected. Thus, the ratio of the remaining anti-cavitation film (survival rate) could be measured by comparing the strength of the signals from the constituent elements in each layer prior to the aforementioned times of ink ejection, with those thereafter.

TABLE 1

| Exp. | Max. temp. | Burnt deposit | Ejection stability | Disconnection | Survival rate |
|---|---|---|---|---|---|
| 1 | 541 (° C.) | substantially nothing | G | No | 100 (%) |
| 2 | 556 | substantially nothing | G | No | 100 |
| 3 | 560 | substantially nothing | G | No | 100 |
| 4 | 570 | substantially nothing | F | No | 85 |
| 5 | 591 | substantially nothing | F | No | 32 |
| 6 | 607 | substantially nothing | F | *1 | non-detectable |
| 7 | 623 (° C.) | substantially nothing | F | *2 | non-detectable |

*1: Occurred at $3.3 \times 10^8$ ejections
*2: Occurred at $6.7 \times 10^8$ ejections
G: Good
F: Fair Further, the relationship between the ratio of the remaining anti-cavitation film and the highest reached temperature is plotted in FIG. 14.

Among these test data, the first to third embodiments of the present invention correspond to the first to third test data one for one.

Figure 14:
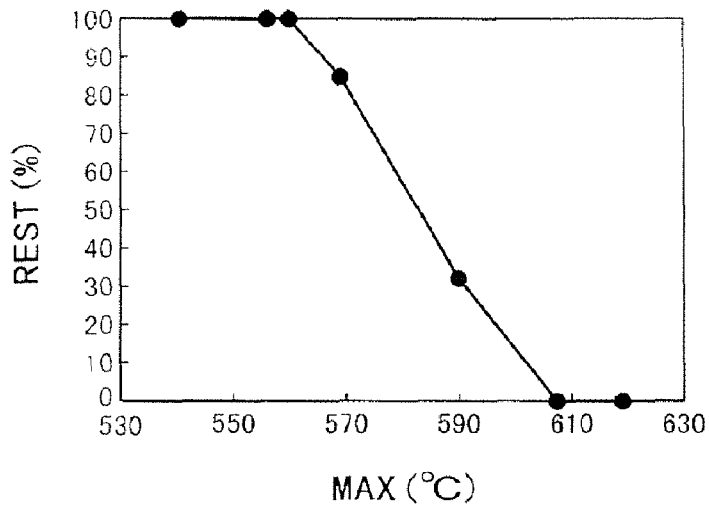
FIG. 14 is a graph which shows the relationship between the ratio of the remaining portion of the anti-cavitation film and the highest temperature which the temperature of the surface of the anti-cavitation film reached.

As is evident from Table 1 and FIG. 14, when the highest reached temperature was no higher than 560° C. (in other words, in the cases of the first to third embodiments), the anti-cavitation film was not corroded at all. As described above, the recording heads used in this experiment were highly reduced in size, and therefore their anti-cavitation films were very thin. Thus, the corrosion of the protective films was seen in tests 4-7. In tests 6 and 7 in which the highest reached temperatures were 607° C. and 623° C., respectively, wiring breakage, which seemed to be traceable to the anti-cavitation film corrosion, was seen.

Regarding the burnt deposit, none was seen in any of these tests. It was thought that the chelating reagent having been added to ink was responsible for this.

As described above, through these tests, it became evident that if the temperature at the interface between the surface of the anti-cavitation film and ink was kept no higher than 560° C., the precipitation of burnt ink ingredients and corrosion of anti-cavitation film could be controlled, so that ink could be consistently ejected.

(Tests 4-10)

Inks 2-8 were formulated in the following manner. After the following ingredients (the ingredients listed below) were mixed, and were stirred no less than two hours, and the mixtures were adjusted to predetermined pH levels, using 10% water solution of sodium hydroxide. Then, the mixtures were filtered with a membrane film with a pore diameter of 0.2 µm, obtaining inks 2-8.

TABLE 2

| Ink | Colorant (wt. %) | Chelating agent (wt. %) | Solvent (wt. %) | pH |
|---|---|---|---|---|
| 2 | C.I. Direct Yellow 86 (2) | EDTPO (2) | Diethyleneglycol (15) Isopropylalcohol (4) Water (77) | 5 |
| 3 | C.I. Food Block 2 (3) | EDTA (3) | Diethyleneglycol (20) Water (74) | 8 |
| 4 | C.I. Direct Black 199 (2.5) | EDTPO (1) | Triethyleneglycol (10) Water (86.5) | 9 |
| 5 | C.I. Direct Black 154 (2) | Tripoly-phosphoric acid (5) | Thiodiglycol (15) Water (78) | 4 |
| 6 | C.I Acid Black 52:1 (3) (chrome-containing dye) | Citric acid (0.1) | Urea (5) Water (91.9) | 10 |
| 7 | C.I Acid Violet 90 (2) (chrome-containing dye) | HEDTA (0.5) | Trimethylol propane (5) Water (92.5) | 7 |
| 8 | C.I Direct Blue 86 (2.5) | EDTA (0.01) | Diethyleneglycol (10) Water (87.49) | 7 |

Each of the thus obtained inks was ejected $6 \times 10^8$ times from the aforementioned recording head which was provided with a 0.2 µm thick anti-cavitation film formed of Ta and a 0.5 µm thick protective film formed of silicon nitride, and which was structured so that the amount of ink ejected from each orifice per ejection became 50 pico-liter, while keeping the temperature at the interface between the anti-cavitation film surface and the ink no more than 541° C. Thereafter, the recording heads were measured with respect to precipitation of burnt ink ingredients, consistency in ejection amount, and corrosion of the anti-cavitation film as in the first test. The results are given in Table 3.

TABLE 3

|  | Ink | Burnt deposit | Ejection stability | Survival rate |
|---|---|---|---|---|
| Emb. 4 | 2 | No | G | 100% |
| Emb. 5 | 3 | No | G | 100% |
| Emb. 6 | 4 | No | G | 100% |
| Emb. 7 | 5 | No | G | 100% |
| Emb. 8 | 6 | No | G | 100% |
| Emb. 9 | 7 | No | G | 100% |
| Emb. 10 | 8 | No | G | 100% |

G: Good

As is evident from Table 3, whichever ink was used, neither the precipitation of burnt ink ingredients nor the corrosion of protective film was seen. Further, even when inks formed by eliminating chelating reagent from the ingredients for the inks 2, 3, and 8 were used, neither precipitation of burnt ink ingredients nor the corrosion of the protective film was seen.

On the other hand, when the above described inks 2-8 were ejected $6 \times 10^8$ times while keeping the aforementioned interface temperature no higher than 607° C., the thinning of the anti-cavitation film had progressed far enough to suggest the possible breakage of the heat generating head, in the cases of all inks.

When inks formed by eliminating chelating reagent from the ingredients for the inks 2, 3, and 8 were used, the corrosion of the protective film was not seen, but in the cases of some inks, the precipitation of burnt ink ingredients was seen on the surface of the protective film on the heat generating element.

From the above observation, it is evident that when ink contains chelating reagent, the precipitation of burnt ingredients, and the corrosion of the anti-cavitation film can be better controlled to consistently eject ink, by keeping the temperature of the interface between the surface of the anti-cavitation film and ink no higher than 560° C.

Further, it is evident that even when ink does not contain chelating reagent, the precipitation of burnt ingredients and the corrosion of the anti-cavitation film can be controlled to consistently eject ink, by keeping the temperature of the interface between the surface of the anti-cavitation film and ink no higher than 560° C.

Further, when ink was ejected from the heat generating heads with an anti-cavitation film formed of amorphous alloy containing Ta, more specifically, Ta18Fe57Ni8Cr17, in the same manner as in tests 4-9, the ratio of the remaining anti-cavitation film did not drop at all even when the temperature at the interface between the surface of the anti-cavitation film and ink was allowed to reach as high as 560° C. In other words, it became evident that the precipitation of burnt ingredients and the corrosion of the anti-cavitation film were better controlled to consistently eject ink.

(Tests 11-14)

Tests 11-14 were carried out under the following conditions.

| Ink | Solvent | | | | Additive | | Purified water |
|---|---|---|---|---|---|---|---|
|  | Urea | DEG | TDG | Gly | IPA | Dye |  |
| A | 7.5 | 5.0 |  | 7.5 | 2.5 | C.I. Direct Yellow 86 2% | 75.5 |
| B |  | 10.0 | 10.0 |  | 2.5 | C.I. Acid Red 35 2.5% | 75.5 |
| C | 7.5 |  | 5.0 | 7.5 | 2.5 | C.I. Direct Blue 199 3% | 75.5 |
| D | 7.5 |  | 5.0 | 7.5 | 2.5 | C.I. Food Black 2 3% | 75.5 |

DEG: Diethyleneglycol
TDG: Thiodiglycol
Gly: Glycerine
IPA: Isopropylalcohol

Material for Anti-Cavitation Film 16-1

| B1: | Ta (2000 Å) |
|---|---|
| B2: | amorphous Ta (2000 Å) |

Material for Protective Film 16-2

| | |
|---|---|
| C1: | SiN (5000 Å) |
| C2: | SiO$_2$ (5000 Å) |
| C3: | SiC (5000 Å) |

Material for Heat Generating Member 18

| | |
|---|---|
| D1: | TaN (400 Å) |
| D2: | TaSiN (100 Å) |
| D3: | TaAl (500 Å) |

Driving Conditions

| | |
|---|---|
| heater size: | 25 μm × 100 μm |
| voltage applied: | 20 [V] (constant) |

The highest temperature level which the aforementioned interface temperature reached was adjusted by varying the width of the applied pulse within a range of 1.0-8.0 (μsec).

In other words, the highest temperature level which the heater surface temperature reaches can be obtained by solving Equation (4) given above, using the values of the above conditions as inputs.

Under various combinations of the above given conditions, the length of heater durability was measured. The results are given in the following table.

Incidentally, the heat storage layer (SiO2) was 1.7 μm thick, and the silicon substrate was 625 μm.

| | Exp. 11 | Exp. 12 | Exp. 13 | Exp. 14 |
|---|---|---|---|---|
| Composition | A | B | C | D |
| Anti-cav.-film | B1 | B1 | B2 | B2 |
| Protection layer | C1 | C1 | C2 | C3 |
| HTR | D1 | D2 | D2 | D3 |
| DRIVING | * | * | * | * |
| MAX ≦560° C. | E | E | E | E |
| 600° C. | B | B | B | B |
| 700° C. | N | N | N | N |

*: Constant except for pulse width
E: No change in HTR after 1.0 × 10$^9$ pulses
B: HTR break around 1.0 × 10$^8$-2.0 × 10$^8$ pulses
N: HTR break less than 1.0 × 10$^8$ pulses.

These tests proved that the present invention was effective even when chelating material was not in the ink. Further, it is evident from the above results that the present invention is effective regardless of not only the type of ink, but also the types of protective film and exothermic resistor material.

(Printing Tests)

Printing operations were actually carried out using an ink jet recording apparatus fitted with a recording head, which will be described next, under a condition disclosed in the present invention. The results were excellent.

Figure 12:
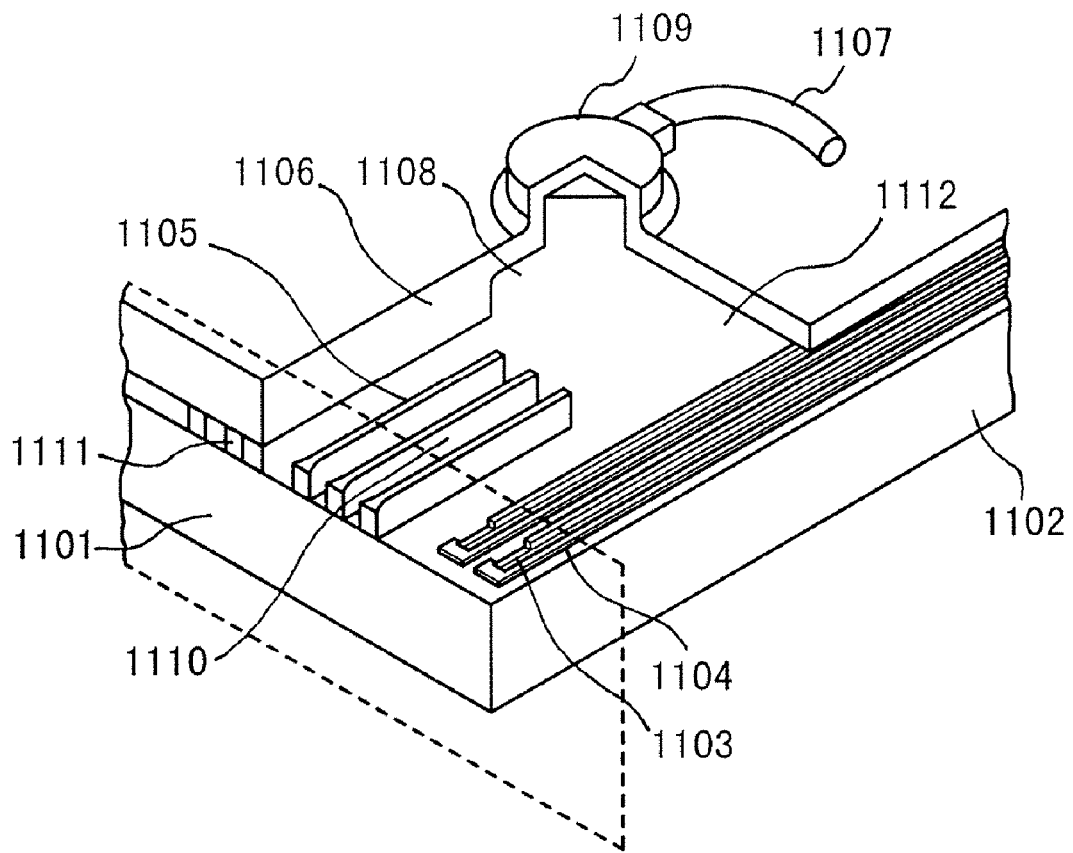
FIG. 12 is a schematic perspective view of a recording head in accordance with the present invention.

FIG. 12 is a schematic drawing of a recording head and shows the general structure of the head. The recording head comprises: a plurality of heat generating heads 1103, wires 1104, ink path walls 1105, which are formed in layers on a substrate 1102, in the form of film, through semiconductor manufacturing processes such as etching depositing, and sputtering; and a top plate 1106. Ink 1112 is supplied into a common ink chamber 1108 of the recording head 1101, through an ink supply tube 1107 from an unillustrated ink storage chamber. A referential numeral 1109 stands for an ink supply tube connector. After being supplied into the common ink chamber 1108, the ink 1112 is drawn into the ink paths 1110 by capillary force, and is stably retained there as the ink in each ink path 1110 forms a meniscus at the opening, that is, orifice, of the outermost side of the ink path 1110. In this state, power is selectively supplied to the heat generating heads. As the power is supplied, ink is suddenly heated, and as a result, a bubble is generated in the ink path. As the bubble expands and contracts, ink is ejected from an ejection opening 1111, in the form of an ink droplet. As to the power supplied to the heat generating heads, the power is controlled so that the temperature at the interface between the heating element surface and the ink reaches no higher than 560° C.

Figure 13:
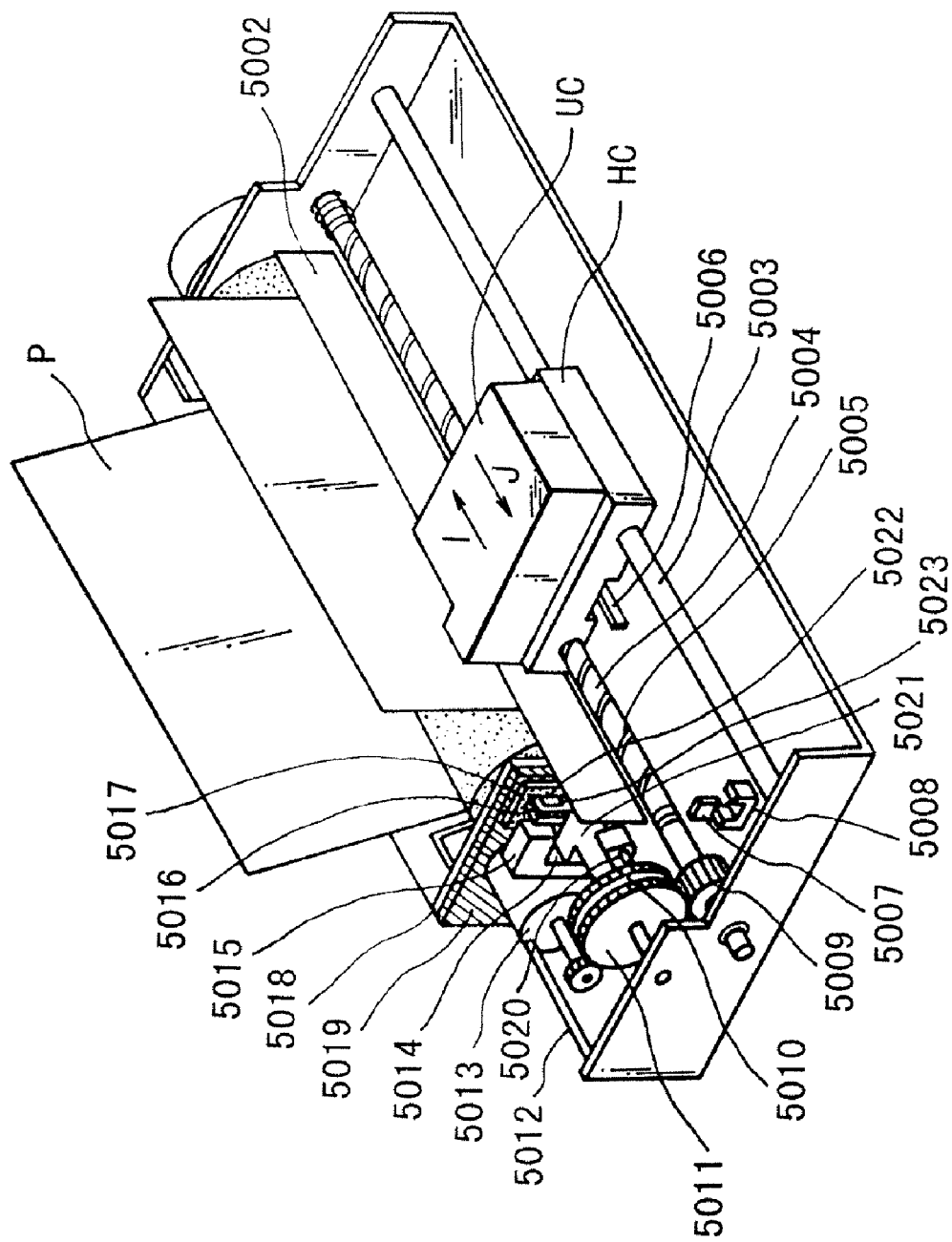
FIG. 13 is a schematic view of an ink jet recording apparatus in accordance with the present invention.

FIG. 13 is an external view of an ink jet recording apparatus to which the present invention is applicable. This ink jet recording apparatus comprises a carriage HC, the pin (unillustrated) of which fits in the spiral groove 5005 of the lead screw 5004 rotated through driving force transmission gears 5011 and 5009 which rotate forward or in reverse as a driver motor 5013 rotates forward or in reverse. Thus, as the motor 5013 rotates forward or in reverse, the carriage HC is shuttled in the direction of an arrow mark. A referential numeral 5002 stands for a paper pressing plate, which keeps paper pressed upon a platen 5000 across the entire shuttling range of the carriage HC. Referential numerals 5007 and 5008 stand for two sections of a photocoupler which constitutes a home position detecting means for reversing the rotational direction of the driver motor 5013; the presence of the lever 5006 of the carriage HC in the gap of the photocoupler is detected. A referential numeral 5016 stands for a member for supporting a capping member 5022 for capping the front surface of the recording head, and a referential numeral 5015 stands for a suctioning means for suctioning the substance within the cap in order to restore the performance of the recording head by suctioning the substance within the recording head through the opening 5023 of the cap. A referential numeral 5017 stands for a cleaning blade, and a referential numeral 5019 stands for a member which enables this blade 5019 to move frontward or rearward. The cleaning blade 5017 and this member for moving the blade 5017 are supported by the supporting plate 5018 of the apparatus main assembly. As to blade configuration, it does not need to be the one in this embodiment; any known cleaning blade may be employed, which is obvious. A referential numeral 5012 stands for a lever which triggers the suctioning operation for restoring the recording head performance, and moves as a cam 5020 engaged with the carriage HC moves; its movement is controlled as the driving force from the driver motor is controlled through a driving force transmitting means comprising a clutch and the like.

This ink jet recording apparatus is structured so that capping, cleaning, and suctioning means are structured to be moved by the lead screw 5004 to be activated at their designated positions. However, there is no restriction regarding the configurations of these means; as long as they can be activated to carry out the predetermined operations with known timings, they are compatible with the present invention. Each of the above described structures constitutes an excellent invention, whether individually or in combination with the others. This apparatus is provided with a driving signal supplying means for driving the ink ejection pressure generating elements.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording method comprising applying a drive signal to a heat generating resistor provided in an ink jet head substrate, the heat generating resistor being coated with a protecting film, thereby generating thermal energy which is applied to the ink through the protecting film to create a bubble by film boiling of the ink, thereby generating pressure causing ink ejection, said method comprising the steps of:

selecting a value relating to a pulse width of a driving signal to be applied to said heat generating resistor, from values which are stored in an information storing portion provided in said recording head on the basis of data obtained by a temperature sensor provided on said substrate, such that the maximum reaching temperature of a contact surface of the protecting film relative to the ink does not exceed 560° C.; and ejecting the ink by driving said heat generating resistor on the basis of the value selected in said selecting step.

2. The method according to claim 1, wherein said controlling step comprises:

measuring a temperature of the substrate; and stopping the application of the drive signal to the heat generating resistor when a discrimination is made that control is not possible to make the maximum temperature not higher than 560° C., on the basis of the temperature and a driving signal.

3. The method according to claim 1, wherein the ink contains a chelate agent.

4. The method according to claim 3, wherein the content of the chelate agent is not less than 50 weight ppm and not more than 20 weight %.

5. The method according to claim 1, wherein said protecting film comprises a plurality of layers, and a layer which may contact the ink is an anti-cavitation film made of amorphous alloy comprising Ta.

6. The method according to claim 5, wherein the amorphous alloy comprises one or more metal materials selected from the group consisting of Fe, Cr, Re, Ge and Ni.

7. The method according to claim 6, wherein the amorphous alloy comprises Ta, Fe, Cr and Ni, and a content of Ta is not more than 30 weight % on the basis of the total weight of the amorphous alloy.

* * * * *